United States Patent
Panaiotis

(10) Patent No.: US 9,898,249 B2
(45) Date of Patent: Feb. 20, 2018

(54) SYSTEM AND METHODS FOR SIMULATING REAL-TIME MULTISENSORY OUTPUT

(71) Applicant: STC.UNM, Albuquerque, NM (US)

(72) Inventor: Panaiotis, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 379 days.

(21) Appl. No.: 14/433,146

(22) PCT Filed: Oct. 8, 2013

(86) PCT No.: PCT/US2013/063810
§ 371 (c)(1),
(2) Date: Apr. 2, 2015

(87) PCT Pub. No.: WO2014/058835
PCT Pub. Date: Apr. 17, 2014

(65) Prior Publication Data
US 2015/0268926 A1    Sep. 24, 2015

Related U.S. Application Data

(60) Provisional application No. 61/711,159, filed on Oct. 8, 2012.

(51) Int. Cl.
| | | |
|---|---|---|
| *G10H 1/36* | (2006.01) | |
| *G06F 3/16* | (2006.01) | |
| *G06F 3/01* | (2006.01) | |
| *G06F 9/44* | (2018.01) | |

(52) U.S. Cl.
CPC ............. *G06F 3/167* (2013.01); *G06F 3/011* (2013.01); *G06F 3/017* (2013.01); *G06F 8/38* (2013.01)

(58) Field of Classification Search
CPC .. G10H 2220/206; G10H 1/00; G10H 1/0033; G10H 2240/325
See application file for complete search history.

(56) References Cited

U.S. PATENT DOCUMENTS

| | | | | |
|---|---|---|---|---|
| 5,510,572 A * | 4/1996 | Hayashi | ............... | G10H 1/38 84/609 |
| 5,694,535 A | 12/1997 | Broekhuijsen | | |
| 5,741,990 A * | 4/1998 | Davies | ............... | G09B 15/004 84/423 R |
| 8,847,053 B2 * | 9/2014 | Humphrey | ............ | G09B 5/065 434/308 |
| 2006/0117067 A1 | 6/2006 | Wright et al. | | |
| 2007/0256546 A1 * | 11/2007 | Hikino | ............... | G10H 1/348 84/615 |
| 2009/0038467 A1 * | 2/2009 | Brennan | ............... | G09B 5/00 84/609 |
| 2010/0014692 A1 | 1/2010 | Schreiner et al. | | |

(Continued)

FOREIGN PATENT DOCUMENTS

| | | |
|---|---|---|
| JP | 47964499 | 8/2011 |
| WO | WO201004473 | 1/2010 |

*Primary Examiner* — Marlon Fletcher
(74) *Attorney, Agent, or Firm* — Valauskas Corder LLC

(57) ABSTRACT

The invention is directed to a system and methods allowing a user to interact with one or more data applications—including for example, games, music, music composition and tactile stimulation—to simulate real-time multisensory output. The invention includes a music program, a music texture program and a simulation program.

24 Claims, 34 Drawing Sheets

(56) References Cited

U.S. PATENT DOCUMENTS

2011/0191674 A1 8/2011 Rawley et al.
2012/0174737 A1* 7/2012 Risan ................... G10L 13/033
                                                                               84/622

* cited by examiner

345

| | Pulse Index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|
| Up to 16 Pulses 4 notes per pulse | | | | | Emphasis Definition Assignment | | | | | | | | | | | | |
| 301 | 0 – 15 | 1 | 3 | 2 | 3 | 2 | 1 | -1 | 2 | 0 | 2 | -2 | 0 | 0 | 0 | 0 | 0 |
| | | 2 | 0 | 2 | 0 | 2 | 2 | -1 | 3 | 0 | 2 | -2 | 0 | 0 | 0 | 0 | 0 |
| | | 4 | 0 | 0 | 0 | 0 | 3 | -1 | 0 | 0 | 0 | 0 | 0 | 0 | 0 | 0 | 0 |
| | | 5 | 0 | 0 | 0 | 0 | 0 | 0 | 0 | 0 | 0 | 0 | 0 | 0 | 0 | 0 | 0 |

| | Pulse Index | Emphasis Definition Assignment | | | | | | | | | | | | | | | |
|---|---|---|---|---|---|---|---|---|---|---|---|---|---|---|---|---|---|
| 17 – 32 Pulses 2 notes per pulse | 0 – 15 | 1 | 3 | 2 | 3 | 2 | 1 | -1 | 2 | 0 | 2 | -1 | 7 | 0 | 2 | 0 | 2 |
| | | 2 | 0 | 2 | 0 | 2 | 2 | -1 | 3 | 0 | 2 | -1 | 8 | 0 | 0 | 0 | 4 |
| 302 | 16 – 31 | 4 | 0 | 0 | 0 | 0 | 3 | -1 | 0 | 0 | 0 | 0 | 0 | 2 | 0 | 0 | 0 |
| | | 5 | 0 | 0 | 0 | 0 | 0 | 0 | 0 | 0 | 0 | 0 | 0 | 0 | 0 | 0 | 0 |

| | Pulse Index | Emphasis Definition Assignment | | | | | | | | | | | | | | | |
|---|---|---|---|---|---|---|---|---|---|---|---|---|---|---|---|---|---|
| 33 – 64 Pulses 1 note per pulse | 0 – 15 | 1 | 3 | 2 | 3 | 2 | 1 | -1 | 2 | 0 | 2 | -2 | 0 | 7 | 0 | 0 | 0 |
| | 16 – 31 | 2 | 0 | 2 | 0 | 2 | 2 | -1 | 3 | 0 | 2 | -2 | 0 | 8 | 0 | 0 | 0 |
| | 32 – 47 | 4 | 0 | 0 | 0 | 0 | 3 | -1 | 0 | 0 | 0 | 0 | 0 | 0 | 0 | 0 | 0 |
| 303 | 48 – 63 | 5 | 0 | 0 | 0 | 2 | 0 | 0 | 0 | 3 | 0 | 0 | 0 | 0 | 0 | 0 | 9 |

| | | | |
|---|---|---|---|
| 111 | The counter counts from 0 to 2. | | |
| | The index is used as the input for the permutation generator. | | 0  1  2 |
| 112 | The counter index is sent to the permutation generator, which is set to the order: | | 2  0  1 |
| 113 | The permutation output is used as the input to the chord subset generator. | | |
| 114 | The chord subset generator is defined as u7:3-3:m0 < 2 2 : 3>. <br>     Universe size is the outer scale size. <br>     Class size is 3 (number of chord members). <br>     Class index is 3, for array < 2 2 : 3 >. <br>     Mode 0 gives us the root inversion of the chord. | Chord Index   0   1   2 <br><br> Scale Index   1   3   5 | |
| 115 | The consequential output array is the unordered set [1, 3, 5]. <br> Applying the permutation produces the ordered set [ 5, 1, 3] | | 5  1  3 |
| 116 | The scale subset generator is parameterized with u12:7-34:m1 <br>     Universe size 12 (12-tone PC set) <br>     Class size 7 for a heptatonic scale. <br>     Array class index 37 < 1 1 3 1 2 1 : 3 > <br>     Mode 1 shifts the interval array to: < 1 3 1 2 1 3 : 1 > | | |
| 117 | The unordered subset is [0, 1, 4, 5, 7, 8, 11], which is the scale shown on the right at transposition 0, which starts the scale at C. <br>     A scale input index of 5 will output 8 <br>     Input of 1 will output 1 <br>     Input 3 will output 5 | Scale Index   0  1  2  3  4  5  6 <br><br> PC Index   0  1  4  5  7  8  11 | |
| 118 | Therefore, the corresponding output for the chord permutation is: | | 8  1  5 |
| 119 | The chord will cycle through the ordered pitch class set: | | Ab  Db  F |

FIG. 15

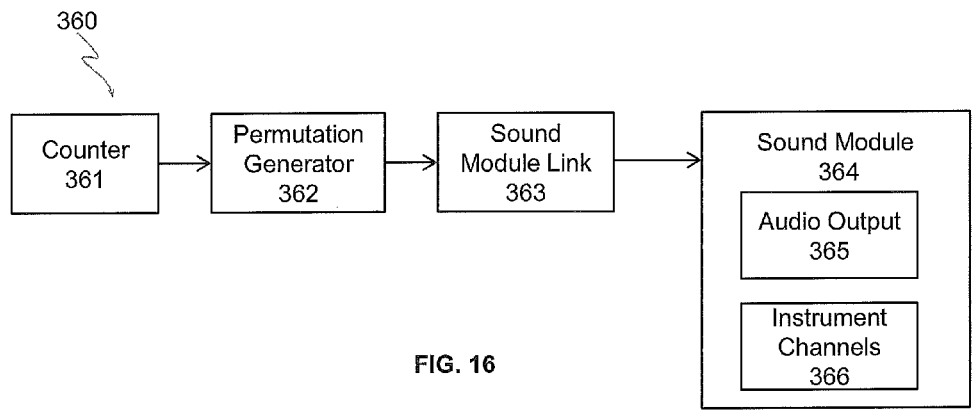

FIG. 16

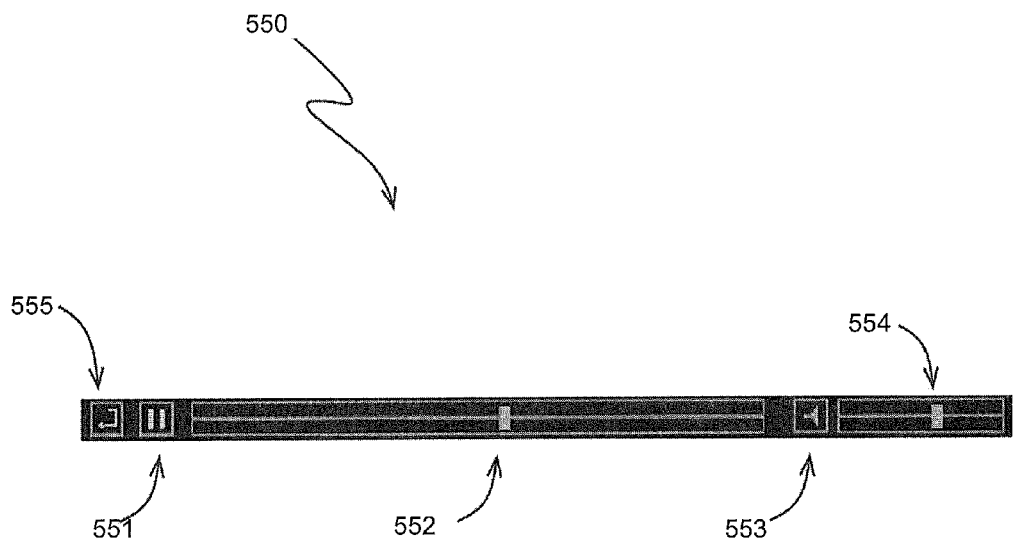

FIG. 35

| Hover/Click control | Select between the hover and click mode of button selection |
|---|---|
| Hover select sensitivity | Change the amount of hover time before selection was activated in hover mode. |
| Restore defaults | Restore User Preferences with factory default settings |
| Pulse Flash on/off | The baton pulse flashed in the center of the Melody Palette. This turned off the pulse and measure flashing. |
| Pulse Flash intensity | Three levels of intensity were offered for the measure and pulse flashers. |
| Quit Program | Quit the program |

FIG. 36

| | BASIC SCALE DIMENSIONS |
|---|---|
| Octave Ratio: | This defined what was considered to be the ratio at which a scale-tuning system was defined with its own set of pitch classes. |
| Scale Size: | The number of pitch classes defined in the tuning system. |
| | INPUT AND OUTPUT MICROTONE MODES |
| Octave Division In: | The number of microtones between octaves that certain types of scale tuning definitions used to calculate their frequency. |
| Octave Division Out: | The number of microtones between octaves used as the output deviation quantization level for output tuning lists. |
| | REFERENCE FREQUENCY BASIS |
| Middle C register: | This value sets the register value used to refer to Middle C in Western tonality. It defaulted to 4. |
| Reference Register: | Specified the register of the reference frequency, which defaulted to 4. |
| Reference Frequency: | The reference frequency used to calculate the other pitches in the tuning system. |
| Reference Index: | Index of the pitch class associated with the reference frequency. |
| | CALCULATION BASIS FOR INTERVALS BETWEEN SCALE MEMBERS |
| Tuning Definition Type: | Type of scale definition (or method of calculation) used to calculate the associated frequency of each pitch class. |
| Tuning Definition List: | List of values according to the Tuning Definition Type above. |
| | TONIC PITCH CLASS AND FREQUENCY ARRAY |
| Tonic Pitch Class: | The pitch class specified as the first note of a scale. |
| Tonic Options: | Options that determined how the frequency of the tonic was ultimately calculated. |
| Pitch Class Hold | Pitch class to hold for Hold Equal-Tempered Reference Frequency option |
| Tonic Frequency List: | List of frequencies if Tonic Option was Frequency List |
| Scale Micro Offset: | Shift scale frequencies by this number of microtones. |
| | REQUESTING A FREQUENCY VALUE FOR A PITCH CLASS IN A SPECIFIC REGISTER |
| Register | Requested register used to calculate actual frequency of a pitch based on the reference register. |
| Pitch Class | Requested pitch class |
| Microtonal Offset | Additional deviation from the expected output. |

FIG. 37

| Parameter | Basic Scale Dimensions |
|---|---|
| Octave Ratio: | The octave ratio was used in final calculations to distinguish registers. Most music systems were based on a 2:1 ratio, or a value of 2.0. Wider scales had values greater than 2.0 while narrower scales had ratios between 1.0 and 2.0, exclusive. A scale that spanned two traditional octaves used an octave value (in this system) of 4.0. A scale spanning only a perfect fifth used an octave ratio of 1.5 (or 3:2 frequency ratio). |
| Scale Size: | The scale size determined the number of scale members (pitch classes) spanning one octave. Scale size was usually 12 for 12-tone systems. The range was from 2 to 72. Larger and smaller ranges were possible and conceived but not supported in this embodiment. |
| | Input and Output Microtone Modes |
| Octave Division In: | Input microtonal division: usually 1200 or 72. This was the number of microtones between octaves that certain types of scale tuning definitions used to calculate their frequency. This value was used for internal calculations before final output. |
| Octave Division Out: | Output microtonal division: usually 1200 or 72. This was the number of microtones between octaves used as the output deviation quantization level for output tuning lists. It was useful in cases for which the tuning definition was in one microtonal system and the device that the output was fed to needed to be in terms of a different system. |

FIG. 38

|  | REFERENCE FREQUENCY BASIS |
|---|---|
| Middle C register: | This value set the register value used to refer to Middle C in Western tonality. It defaulted to 4. |
| Reference Register: | Register of reference frequency: usually 4. Each octave as defined by the octave ratio was called a register. To describe a specific tuning, the tuning definition defined relationships between pitches within one octave. The actual frequency associated and calculated depended on the frequency assigned to a particular pitch class in a particular register. This value specified the register of the reference frequency. |
| Reference Index: | Index of pitch class associated with the reference frequency: 9 for A. This assumed that the Western pitch class 'C' was 0, with each semitone in ascent, incrementing by one index value. The reference index was optionally any pitch class. |
| Reference Frequency: | Reference frequency: defaulted to 440 but was any frequency. The reference frequency was used to calculate the other pitches in the tuning system. |

FIG. 39

|  | CALCULATION BASIS FOR INTERVALS BETWEEN SCALE MEMBERS |
|---|---|
| Tuning Definition Type: | Type of scale definition (or method of calculation). The scale pitches were defined by a list of values used to calculate the associated frequency of each pitch class. There were several methods to define the frequency calculation.<br>1. Intervals defined successive ascending pitches by indicating how many microtones (as defined by the octave division value) between them.<br>2. Scale list was similar, except each pitch class was given as a microtonal distance from the tonic.<br>3. Equal-tempered deviation specified the microtonal deviation of each pitch class from the closest equal-tempered correspondence.<br>4. Frequency list specified the relationships by listing the frequencies of pitch classes within an octave.<br>5. Ratios defined frequencies with an array of list pairs giving the ratio (using numerator/denominator) of each note from the tonic. |
| Tuning Definition List: | List of values according to the Tuning Definition Type above |

FIG. 40

| Octave ratio | 2.0 |
|---|---|
| Scale size | 12 |
| Octave Division Input | 1200 |
| Octave Division Output | 1200 |
| Middle C register | 4 |
| Reference Register | 4 |
| Reference Index | 9 |
| Reference Frequency | 440.0 |

FIG. 41

| PC Index | Equal Tempered | | | | Variable | | | |
|---|---|---|---|---|---|---|---|---|
| | Interval List | Scale List | E.T. Dev. | Freq. List | Interval List | Scale List | E.T. Dev. | Freq. List |
| 0 | | 0 | 0 | 261.63 | | 0 | 0 | 261.63 |
| | 100 | | | | 100 | | | |
| 1 | | 100 | 0 | 277.18 | | 100 | 0 | 277.18 |
| | 100 | | | | 50 | | | |
| 2 | | 200 | 0 | 293.66 | | 150 | -50 | 285.30 |
| | 100 | | | | 100 | | | |
| 3 | | 300 | 0 | 311.13 | | 250 | -50 | 302.27 |
| | 100 | | | | 200 | | | |
| 4 | | 400 | 0 | 329.63 | | 450 | 50 | 339.29 |
| | 100 | | | | 25 | | | |
| 5 | | 500 | 0 | 349.23 | | 475 | -25 | 344.22 |
| | 100 | | | | 150 | | | |
| 6 | | 600 | 0 | 369.99 | | 625 | 25 | 375.38 |
| | 100 | | | | 50 | | | |
| 7 | | 700 | 0 | 392.00 | | 675 | -25 | 386.38 |
| | 100 | | | | 125 | | | |
| 8 | | 800 | 0 | 415.30 | | 800 | 0 | 415.30 |
| | 100 | | | | 100 | | | |
| 9 | | 900 | 0 | 440.00 | | 900 | 0 | 440.00 |
| | 100 | | | | 100 | | | |
| 10 | | 1000 | 0 | 466.16 | | 1000 | 0 | 466.16 |
| | 100 | | | | 150 | | | |
| 11 | | 1100 | 0 | 493.88 | | 1150 | 50 | 508.36 |
| | 100 | | | | 50 | | | |
| (0) | | (1200) | | 523.25 | | (1200) | | 523.25 |

FIG. 42

| INTERVALS | 0 | 1 | 2 | 3 | 4 | 5 | 6 | 7 | 8 | 9 | 10 | 11 |
|---|---|---|---|---|---|---|---|---|---|---|---|---|
| Cents | 100 | 50 | 100 | 200 | 25 | 150 | 50 | 125 | 100 | 100 | 150 | 50 |
| Shruti | 6 | 3 | 6 | 12 | 1.5 | 9 | 3 | 7.5 | 6 | 6 | 9 | 3 |

FIG. 43

| Scale Index | Equal Tempered | | Pythagorean | | | | |
|---|---|---|---|---|---|---|---|
| | Scale List | Freq. List | Ratios | Interval List | Scale List | E.T. Dev. | Freq. List |
| 0 | 0 | 261.63 | 1 : 1 | | 0.00 | 0.0 | 261.63 |
| | | | | 90.22 | | | |
| 1 | 100 | 277.18 | 256 : 243 | | 90.22 | -9.8 | 275.62 |
| | | | | 113.69 | | | |
| 2 | 200 | 293.66 | 9 : 8 | | 203.91 | 3.9 | 294.33 |
| | | | | 90.22 | | | |
| 3 | 300 | 311.13 | 32 : 27 | | 294.13 | -5.9 | 310.07 |
| | | | | 113.69 | | | |
| 4 | 400 | 329.63 | 81 : 64 | | 407.82 | 7.8 | 331.12 |
| | | | | 90.22 | | | |
| 5 | 500 | 349.23 | 4 : 3 | | 498.04 | -2.0 | 348.83 |
| | | | | 113.69 | | | |
| 6 | 600 | 369.99 | 729 : 512 | | 611.73 | 11.7 | 372.51 |
| | | | | 90.22 | | | |
| 7 | 700 | 392.00 | 3 : 2 | | 701.96 | 2.0 | 392.44 |
| | | | | 90.22 | | | |
| 8 | 800 | 415.30 | 128 : 81 | | 792.18 | -7.8 | 413.43 |
| | | | | 113.69 | | | |
| 9 | 900 | 440.00 | 27 : 16 | | 905.87 | 5.9 | 441.49 |
| | | | | 90.22 | | | |
| 10 | 1000 | 466.16 | 16 : 9 | | 996.09 | -3.9 | 465.11 |
| | | | | 113.69 | | | |
| 11 | 1100 | 493.88 | 243 : 128 | | 1109.78 | 9.8 | 496.68 |
| | | | | 90.22 | | | |
| (0) | (1200) | 523.25 | | | (1200.00) | | 523.25 |

FIG. 44

| | TONIC PITCH CLASS AND FREQUENCY ARRAY |
|---|---|
| Tonic Pitch Class: | The pitch class index designated as the first note of a scale: the tonic. |
| Tonic Options: | Described in greater detail below, these determined how the frequency of the tonic was ultimately calculated.<br>　　Follow equal-tempered Scale<br>　　Hold Reference Frequency of a particular pitch class<br>　　Follow Base Scale<br>　　Frequency List |
| Pitch Class Hold | Pitch class to hold for Hold Equal-tempered Reference Frequency option |
| Tonic Frequency List: | List of frequencies if Tonic Option was Frequency List |
| Micro Offset: | Shift output by this number of microtones according to the input microtonal system: default 0. |

FIG. 45

| A | B | C | D | E | F | G | H |
|---|---|---|---|---|---|---|---|
| Pitch Class Index | E.T. Tonic Freq. | E.T.D. index | E.T. Dev Array | Scale index Tonic at PC 2 | E.T. Dev. | E.T. Dev. | PC Freq. List |
| 0 | 261.63 | 0 | 0 | | | 0 | 261.63 |
| 1 | 277.18 | 1 | 0 | | | 50 | 285.30 |
| 2 | 293.66 | 2 | -50 | 0 | 0 | 0 | 293.66 |
| 3 | 311.13 | 3 | -50 | 1 | 0 | 0 | 311.13 |
| 4 | 329.63 | 4 | 50 | 2 | -50 | -50 | 320.24 |
| 5 | 349.23 | 5 | -25 | 3 | -50 | -50 | 339.29 |
| 6 | 369.99 | 6 | 25 | 4 | 50 | 50 | 380.84 |
| 7 | 392.00 | 7 | -25 | 5 | -25 | -25 | 386.38 |
| 8 | 415.30 | 8 | 0 | 6 | 25 | 25 | 421.35 |
| 9 | 440.00 | 9 | 0 | 7 | -25 | -25 | 433.69 |
| 10 | 466.16 | 10 | 0 | 8 | 0 | 0 | 466.16 |
| 11 | 493.88 | 11 | 50 | 9 | 0 | 0 | 493.88 |
| | | | | 10 | 0 | | |
| | | | | 11 | 50 | | |

FIG. 46

| A | B | C | D | E | F | G | H | I |
|---|---|---|---|---|---|---|---|---|
| Pitch Class Index | E.T. Tonic Freq. | E.T.D. index | E.T. Dev Array | Scale index Tonic PC 3 | E.T. Dev. Rotated | E.T. Dev. Rotated | E.T Dev. Minus 50 | PC Freq. List |
| 0 | 261.63 | 0 | 0 | | | | 0 | -50 | 254.18 |
| 1 | 277.18 | 1 | 0 | | | | 0 | -50 | 269.29 |
| 2 | 293.66 | 2 | -50 | | | | 50 | 0 | 293.66 |
| 3 | 311.13 | 3 | -50 | 0 | 0 | 0 | -50 | 302.27 |
| 4 | 329.63 | 4 | 50 | 1 | 0 | 0 | -50 | 320.24 |
| 5 | 349.23 | 5 | -25 | 2 | -50 | -50 | -100 | 329.63 |
| 6 | 369.99 | 6 | 25 | 3 | -50 | -50 | -100 | 349.23 |
| 7 | 392.00 | 7 | -25 | 4 | 50 | 50 | 0 | 392.00 |
| 8 | 415.30 | 8 | 0 | 5 | -25 | -25 | -75 | 397.70 |
| 9 | 440.00 | 9 | 0 | 6 | 25 | 25 | -25 | 433.69 |
| 10 | 466.16 | 10 | 0 | 7 | -25 | -25 | -75 | 446.40 |
| 11 | 493.88 | 11 | 50 | 8 | 0 | 0 | -50 | 479.82 |
| | | | | 9 | 0 | | | | |
| | | | | 10 | 0 | | | | |
| | | | | 11 | 50 | | | | |

FIG. 47

| A | B | C | D | E | F | G | H | I | J |
|---|---|---|---|---|---|---|---|---|---|
| Pitch Class Index | E.T. Freq. | E.T.D. index | E.T Dev. Array | Base Scale | Scale index Tonic PC 2 | E.T. Dev. Shift | E.T. Dev. Rotated | E.T Dev. Minus 50 | PC Freq. List |
| 0 | 261.63 | 0 | 0 | 261.63 | | | 0 | -50 | 254.18 |
| 1 | 277.18 | 1 | 0 | 277.18 | | | 50 | 0 | 277.18 |
| 2 | 293.66 | 2 | -50 | 285.30 | 0 | 0 | 0 | -50 | 285.30 |
| 3 | 311.13 | 3 | -50 | 302.27 | 1 | 0 | 0 | -50 | 302.27 |
| 4 | 329.63 | 4 | 50 | 339.29 | 2 | -50 | -50 | -100 | 311.13 |
| 5 | 349.23 | 5 | -25 | 344.22 | 3 | -50 | -50 | -100 | 329.63 |
| 6 | 369.99 | 6 | 25 | 375.38 | 4 | 50 | 50 | 0 | 369.99 |
| 7 | 392.00 | 7 | -25 | 386.38 | 5 | -25 | -25 | -75 | 375.38 |
| 8 | 415.30 | 8 | 0 | 415.30 | 6 | 25 | 25 | -25 | 409.35 |
| 9 | 440.00 | 9 | 0 | 440.00 | 7 | -25 | -25 | -75 | 421.35 |
| 10 | 466.16 | 10 | 0 | 466.16 | 8 | 0 | 0 | -50 | 452.89 |
| 11 | 493.88 | 11 | 50 | 508.36 | 9 | 0 | 0 | -50 | 479.82 |
| | | | | | 10 | 0 | | | |
| | | | | | 11 | 50 | | | |

FIG. 48

| A | B | D | E | F | G | H | I | J |
|---|---|---|---|---|---|---|---|---|
| PC Index | Tonic Freq. List | E.T. Dev. Array | Scale index Tonic at PC 7 | E.T. Dev. Rotated | E.T Dev. Rotated | E.T. Freq. List | Result E.T Dev. | PC Freq. List |
| 0 | 264.00 | 0 | | | -25 | 261.63 | 10.00 | 263.14 |
| 1 | 277.00 | 0 | | | 25 | 277.18 | 60.00 | 286.96 |
| 2 | 300.00 | -50 | | | -25 | 293.66 | 10.00 | 295.37 |
| 3 | 310.00 | -50 | | | 0 | 311.13 | 35.00 | 317.48 |
| 4 | 330.00 | 50 | | | 0 | 329.63 | 35.00 | 336.36 |
| 5 | 350.00 | -25 | | | 0 | 349.23 | 35.00 | 356.36 |
| 6 | 375.00 | 25 | | | 50 | 369.99 | 85.00 | 388.61 |
| 7 | 400.00 | -25 | 0 | 0 | 0 | 392.00 | 35.00 | 400.00 |
| 8 | 415.00 | 0 | 1 | 0 | 0 | 415.30 | 35.00 | 423.79 |
| 9 | 442.00 | 0 | 2 | -50 | -50 | 440.00 | -15.00 | 436.20 |
| 10 | 455.00 | 0 | 3 | -50 | -50 | 466.16 | -15.00 | 462.14 |
| 11 | 500.00 | 50 | 4 | 50 | 50 | 493.88 | 85.00 | 518.74 |
| | | | 5 | -25 | | | | |
| | | | 6 | 25 | | | | |
| | | | 7 | -25 | | | | |
| | | | 8 | 0 | | | | |
| | | | 9 | 0 | | | | |
| | | | 10 | 0 | | | | |
| | | | 11 | 50 | | | | |

FIG. 49

| | REQUESTING A FREQUENCY VALUE FOR A PITCH CLASS IN A SPECIFIC REGISTER |
|---|---|
| Register | Requested register was used to calculate actual frequency of a pitch based on the reference register. |
| Pitch Class | Requested pitch class or note value. |
| Microtonal Offset | Additional deviation from the expected output. |

FIG. 50

| | | |
|---|---|---|
| f | Output frequency | |
| F | Pitch class reference frequency | |
| O | Octave ratio | |
| r | Requested register | |
| R | Reference register | |
| m | Microtonal offset | |

FIG. 51

| SOLUTE | REPRESENTATION | ASSOCIATION |
|---|---|---|
| Blood | Red life raft | Carrier of life's essence throughout the body |
| Chloride | Blue wading pool | Chloride was used to clean pools and kill algae |
| Sodium | White salt shaker | While table salt was actually sodium-chloride, the association was important and left open the combination of sodium and chloride as a salt shaker inside the blue wading pool. |
| Sodium-chloride | Salt shaker inside the blue wading pool | See above. |
| Formate | Poison bottle | Elements that the body was trying to excrete |
| Hydrogen | Zeppelin hydrogen dirigible | Use of hydrogen to float above ground. |
| HCO3 | Zeppelin hovering over three oxygen atoms around a carbon Bucky-b | Component representation of one hydrogen and one carbon atom, with three oxygen atoms. |
| Glucose | Ice-cream cone | Sugar |
| Potassium | A bunch of green under-ripe bananas | Bananas are a good source of potassium. |
| Urea | Yellow pyramidal shapes | Mainly the color association with urine. |
| H2O | Blue water drop | Water was H2O |

FIG. 52

| | |
|---|---|
| Curves | Graphic representation in 3-D virtual space used to define particle paths. They were not visible or used in the simulation. They were used by the designer to design paths and were then used to generate node objects. |
| Node Objects | Points along a curve and generated from curve data using the gen_nodes.py Procedural code script to translate curve data and names into lists of nodes. Graphically represented in Modeling And Animation Application as a point with three axes and a name. They were not visible in the simulation because they have no graphic form. However, they did represent an object in memory and were used as tracking points for the Game Engine. (See figure Nodes Along a Curve Segment.) |
| Emitter Objects | Emitters managed activation of particles into particle streams. They were Modeling And Animation Application objects to which the Game Engine triggered a specific Procedural code script and attached a data structure to. Emitters were used as reference to emitter data, which also contained a pool of particles and instructions for activating and managing them. |
| Particles (Solute models) | There was one graphic model object for each solute type. At initialization, copies (instantiations) were generated and attached to specific emitters as needed. |

FIG. 53

| | |
|---|---|
| Emitter descriptors | Defined elements and data for an emitter. |
| Emitter instructions | Message sent to a particular emitter to activate its instructed activation in accordance with its data. |
| Lists of Path Nodes | Each particle had a list of path nodes the Game Engine tracked to move the particle. In addition to a location tracking mechanism, this data determined what the particle did once it reached the virtual location of the node. |
| Path Node List descriptors | These were used during design to define the path segments each particle used during runtime. The Path Node Lists were generated from these descriptors when the Procedural code script containing them ran at initialization. |

FIG. 54

| Used during modeling and design stage ||
|---|---|
| gen_nodes.py | Generated node empties from curve object models |
| Simulation Initialization ||
| sim_gen_nLists.py | Generated Particle Node Path Lists |
| sim_ai_init.py | Initialized emitter data structure |
| sim_emit_init.py | When Game Engine initialized objects, emitters were created and this function was called for each emitter. It also initialized some data. |
| sim_p_init.py | Each particle created at the simulation initialization set up some solute parameters and attached itself to an emitter. |
| Runtime ||
| sim_OSC_rcv.py | Received messages from the Coordinating program via UDP ports using OSC protocol. Triggers sim_ai_tap.py |
| sim_ai_tap.py | Trigger emitters from external trigger source. Used trigger count to determine which emitters to trigger. Called sim_emit_ptcl.py |
| sim_emit_ptcl.py | Called when an emitter received a 't' message, sent during the tap code. Looked for available particles and activated them as needed. |
| sim_p_track.py | Ran at each logic frame (or multiple) to direct a particle towards a node in the node path list. The Game Engine did the actual tracking, which called the function each active particle. This just kept it on track and disabled the particle when it arrived at the end of its path. |

FIG. 55

| Curve | Nodes |
|---|---|
| glom_n6 | glom_n6.000 (first node in curve segment)<br>glom_n6.001<br>...<br>glom_n6.006 (last node in curve segment) |

FIG. 56

| ID index | 180 | Index within list of patch segments for one solute type |
|---|---|---|
| Pointer | 856337080 | Memory location of the node record, calculated at initialization when the data structure wa created. |
| Node name | neph_50.003 | Derived from curve and appended with sequential index of node on curve (see Nodes along a curve segment). Not needed for runtime but used for design evaluation and code diagnostics. |
| Speed factor | 0.6 | Multiplied with global speed value to determine solute speed between nodes. |
| Scale factor | 1.0 | Proportional size of solute to its original model size. |
| Number of branches | 2 | This value was -1 if the solute was to become inactive once it arrived at this node. If the value was 0, there was no branch; the next node in the list was used. |
| Reserved value | 0 | Not used |
| Branches | [] | See below for details |

FIG. 57

| ID index of target node | 287 | From node 180 (example in previous table) -- ------ branch to node 287 |
|---|---|---|
| Pointer | 860056632 | Memory location of the node record |
| Node name | cd_rec_n3.000 | Not needed for runtime but was used for design evaluation and code diagnostics. |
| Probability | 50 | Probability used to determine which branch a particle was branch to. |
| Deactivate | False | Used to deactivate a particle if this branch was chosen. In the case this was True, the branch was be the same as the parent node, i.e. itself. |

FIG. 58

| Emitter Name | emit.alh.00 | This name was used to identify the emitter when using lookup functions in various parts of the process |
|---|---|---|
| Emitter type | b | Types were burst, sequence, and trigger. The type in this example was burst, which means that any streams listed activated a particle each time the emitter was triggered. |
| Counter Detail | [2,1] | Used to determine which receiver index this emitter responded to. |
| Solute pool sizes | [9, 6, 3, 3, 5, 3] | Determined how many particles were created and put in the pool for each particle type listed in the next field. The final value in the list was used for solute types in excess of the number of values in this list. |
| Solute type | ['na_cl', 'na_3', 'cl_3', 'cl_3', 'na_3', 'pot_2', 'pot_3'] | List of particle streams this emitter managed and the particle type used for each stream. This emitter activated 7 particles each time it was triggered. |
| Path Node to start | ['neph_12.000', 'neph_11.001', 'alh_cl_n0.004', 'alh_cl_n0.004', 'alh_na_n0.004', 'alh_pot_n1.000', 'alh_pot_n0.004'] | For each particle type listed above, this indicated at which node in their respective Path Node List to begin. |

FIG. 59

SYSTEM AND METHODS FOR SIMULATING REAL-TIME MULTISENSORY OUTPUT

CROSS-REFERENCE TO RELATED APPLICATIONS

The present application claims priority to U.S. Provisional Patent Application Ser. No. 61/711,159 filed Oct. 8, 2012, hereby incorporated by reference.

FIELD OF THE INVENTION

The invention relates generally to improvements in the interaction between computer users and data applications. More specifically, the invention relates to improvements in simulating real-time multisensory output, for example music output, to improve performance and coordination of data applications.

BACKGROUND OF THE INVENTION

Computer systems, including virtual environment systems, are used for numerous applications such as flight training, surveillance, and even playing computer games. One problem with these computer systems is their inability to effectively simulate real-time multisensory output, which would improve performance and coordination of data applications including, for example, games, music, music composition, and tactile stimulation.

A need therefore exists for an improved method and system to generate content data (i.e., animated image data and audio data) and improve interaction between computer users and data applications including simulation of real-time multisensory output.

SUMMARY OF THE INVENTION

The invention is directed to a system and methods allowing a user to interact with one or more data applications, including for example, games, music, music composition and tactile stimulation to name a few. The user interacts with a data application by manipulating input elements in order to simulate real-time multisensory output. Input elements may include any indicator, icon, virtual button, or illustration appearing on a user interface. More specifically, input elements may be in the form of a push button, scroll bar, or turn dial. This system is intended to simplify the flexible manipulation of input elements in order to simulate real-time multisensory output, which may be in the form of ocular (sight), tactile (touch) auditory (sound) and even olfactory (smell). As an example, the system and methods of the invention may include output of auditory data such as music, or in the form of ocular output such as static illustrations or dynamic (animated) characters.

Although the invention is described with respect to a single interface comprising a plurality of input elements, it is contemplated that the invention may be directed to an interface allowing multiple users, which may be spatially distributed, to simultaneously interact with one or more data applications. As an example, the invention may be directed to operate on a network for multiple users who can each play their own melodies.

Furthermore, the interface can be activated using a point and hover mechanism. This may eliminate audible clicks when activating a mouse button or keyboard, thereby eliminating any possible distraction from the music being played. A point and hover mechanism may also enable people with a repetitive motion injury to move a pointer without activating the mouse button or keyboard. In addition, people with the ability to manipulate a two or more dimensional tracking device can preferably operate virtually any feature of the invention without needing to activate a physical button or computer keyboard.

The invention provides a framework for applications that may be used to create audio content including general-purpose automated music background applications.

With respect to auditory data output, the invention provides a music program and a music texture program such that a user can create a melody in real-time that may be played with an algorithmically generated accompaniment.

One embodiment of the invention enables people—who may have little or no musical background or training—to create melodies against a preferably pre-existing, algorithmically generated accompaniment. The interface for creating a melody, that preferably can be done in real-time, is designed to virtually eliminate the need for pre-knowledge or understanding of the musical structure of the accompaniment. In one embodiment, the user interface is a graphical interface that provides a user with visual feedback such as that which corresponds to an association with musical notes.

Another embodiment of the invention may include adaptable instruments such as for people with mobility limitations. Adaptable instruments may include music software that can enable people with limited musical abilities to participate in active music making. Adaptable instruments may also include instruments with an alternative method of holding that preferably controls the software at whatever level a user finds to be most suitable and enjoyable. Adaptable instruments may also include control interfaces that link the physical instrument to the software. These embodiments are preferably soft and conform to a user's physical body, thereby responding to pressure and movement that can be translatable into control data flow to an output (e.g. sound or as input to a controller processor, or sent as network data).

The invention also provides a framework for audio applications that comprise custom procedural code extensions such as those written in C. Although certain embodiments of the invention are discussed with respect to music, alternative embodiments include but are not limited to teaching complex ideas using mnemonic icons and associations in an immersive computer simulation and serious game environments.

The invention provides a framework for applications that may be used to simulate video content including real-time simulation of video content. In addition, applications may be used to provide a game engine framework including modeling and animation applications. Other applications include an application to contextually produce a visual output on a display and a visual playback application.

With respect to ocular data output, the invention provides a simulation program such that a user can create real-time simulations for use with such data applications directed to gaming or physical or abstract system or process, for example, models that represent characteristics, behaviors, or functions.

Alternative embodiments of the invention can be directed to a diverse array of uses and capabilities, including but not limited to: education, entertainment, relaxation, amateur musical composition, therapy used (e.g. Post-Traumatic Stress Disorder (PTSD) and mental illness/capacity issues), and background music.

Various terms as used throughout the application are defined below.

The term "accompaniment" means a real-time algorithmically generated audio or video file. More specifically, the accompaniment pertains to background music or background video that is used either on its own as ambience or gives a framework over which foreground music or video may be played. In certain embodiments of the invention, the accompaniment is not a pre-recorded file.

The term "permutation" and/or "permutations" as used throughout this application includes but is not limited to patterns of internal organization described by listing the index distance between elements in a particular permutation compared to how the elements are positioned in a reference order. Using a parameter list describing interval array transformations, a particular permutation may be described or generated, depending on context. Characteristics and rules governing permutations are described, as well as some suggestions for their use as analytical and compositional tools.

The term "interval" and/or "intervallic" as used throughout this application includes but is not limited to indications of distance between consecutive indices of a reference order; the distance between indices of an unordered set; the distance in pitch between two pitches or notes; the distance in microtones between two microtonal pitches; and/or any combination thereof.

The terms "register" and "octave register" as used throughout this application includes but is not limited to a range of pitches and/or frequencies that traditionally have a frequency range of some lower frequency f and upper frequency of 2*f. The full range of pitches can be divided into octave registers.

The term "octave" as used throughout this application refers to the span of one tuning register. However, the register may span any range specified by the parameters of the tuning system.

The term "tonic" as used throughout this application includes but is not limited to a first note of a tuning scale.

The term "scale" as used throughout this application includes but is not limited to a musical scale.

The term "pitch class" as used throughout this application includes but is not limited to pitches that are the same distance from the tonic in a tuning scale.

The term "microtone" as used throughout this application includes but is not limited to pitch intervals that are smaller than scale step intervals.

The term "equal-tempered" as used throughout this application includes but is not limited to a series of pitches and/or frequency ratios of approximately equal distance.

The term "Graphical User Interface" object (GUI) as used throughout this application includes but is not limited to a graphical image representation used in computer-based applications that can provide visual feedback to a user utilizing an input device to change one or more parameters of something.

The term "nephron" and/or "kidney" as used throughout this application includes but is not limited to each of the functional units in the kidney, consisting of a glomerulus and its associated tubule, and/or any simulation of its parts thereof.

The terms "instrument patch" and/or "patch" as used throughout this application refer to settings of a sound module that define the quality of the sound output. "Patches" can be thought of as different musical instruments, but can be any sound generated or sampled by the sound module.

The term "instrument channel" as used throughout this application includes but is not limited to a group of parameters that specify a behavior and sound generation of a sound module according to input data (e.g. notes) that determines which instrument channel is to handle the input. Such specification can include instrument patch, panning, and volume, among other things. Sound modules generally have more than one instrument channel. Instrument channels are distinct from "audio channels" of sound modules, which send audio signals to signal outputs.

The term "velocity" as used throughout this application refers to a value interpreted by sound modules that can influence the loudness and/or timbre of an instrument patch.

The invention and its attributes and advantages may be further understood and appreciated with reference to the detailed description below of one contemplated embodiment, taken in conjunction with the accompanying drawings.

DESCRIPTION OF THE DRAWING

The accompanying drawings, which are incorporated in and constitute a part of this specification, illustrate an implementation of the invention and, together with the description, serve to explain the advantages and principles of the invention:

FIG. 15 illustrates an embodiment of pitch class generation according to one embodiment of the invention.

FIG. 16 illustrates the elements of the channel cycler component of the music texture program according to one embodiment of the invention.

FIG. 35 illustrates a graphical user interface for controlling video content of the simulation program according to one embodiment of the invention.

FIG. 36 illustrates an interface for adjusting program options and settings according to one embodiment of the invention.

FIG. 37 is a table illustrating tuning system parameters according to one embodiment of the invention.

FIG. 38 is a table illustrating parameters that affected calculation outcomes according to one embodiment of the invention.

FIG. 39 is a table illustrating equal-tempered deviation according to one embodiment of the invention.

FIG. 40 is a table illustrating parameters for input tuning data according to one embodiment of the invention.

FIG. 41 is a table illustrating parameters for scale definition according to one embodiment of the invention.

FIG. 42 is a table illustrating tuning systems and input lists according to one embodiment of the invention.

FIG. 43 is a table illustrating interval values according to one embodiment of the invention.

FIG. 44 is a table illustrating ratio defined frequencies according to one embodiment of the invention.

FIG. 45 is a table illustrating additional parameters used to calculate the tonic frequency according to one embodiment of the invention.

FIG. 46 is a table illustrating one embodiment of a tonic frequency calculation method according to one embodiment of the invention.

FIG. 47 is a table illustrating one embodiment of a tonic frequency calculation method according to another embodiment of the invention.

FIG. 48 is a table illustrating one embodiment of a tonic frequency calculation method according to yet another embodiment of the invention.

FIG. 49 is a table illustrating one embodiment of a tonic frequency calculation method according to yet another embodiment of the invention.

FIG. 50 is a table illustrating one embodiment of requesting a frequency value for a pitch class according to one embodiment of the invention.

FIG. 51 is a table illustrating the variables for the formula for calculating frequency according to one embodiment of the invention.

FIG. 52 is a table illustrating mnemonic representations according to one embodiment of the invention.

FIG. 53 is a table illustrating different functions of attributes of a game application according to one embodiment of the invention.

FIG. 54 is a table illustrating coordination elements of a game application according to one embodiment of the invention.

FIG. 55 is a table illustrating path design and implementation of a game application according to one embodiment of the invention.

FIG. 56 is a table illustrating curve and calculated node names according to one embodiment of the invention.

FIG. 57 is a table illustrating node record fields according to one embodiment of the invention.

FIG. 58 is a table illustrating branch fields according to one embodiment of the invention.

FIG. 59 is a table illustrating an emitter data structure according to one embodiment of the invention.

DETAILED DESCRIPTION OF THE INVENTION

The invention is directed to a system and methods allowing a user to interact with one or more data applications—including for example, games, music, music composition and tactile stimulation—to simulate real-time multisensory output.

Figure 1:
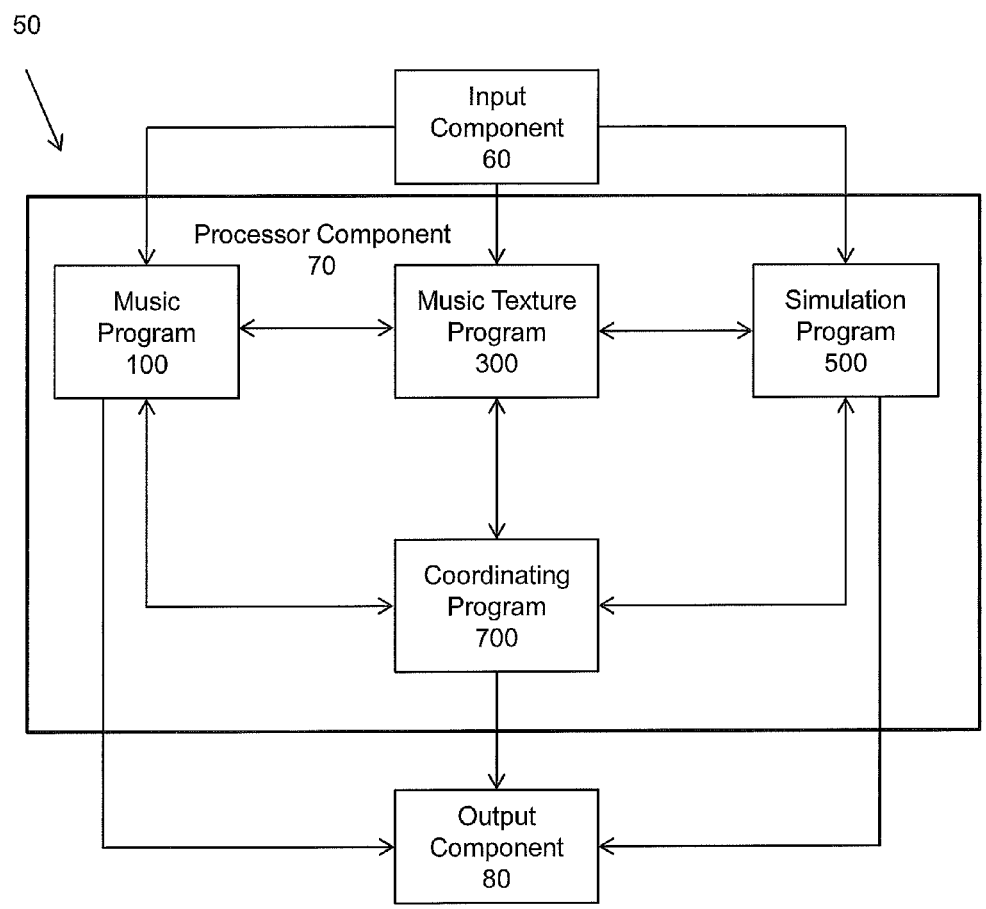
FIG. 1 illustrates the components of a multisensory system according to one embodiment of the invention.

As illustrated in FIG. 1, a multisensory system 50 according one embodiment of the invention includes an input component 60, a processor component 70, and an output component 80.

The input component 60 includes any device, program or interface that provides input to the processor component 70. An input component 60 may include, for example, one or more of the following: a display (i.e., touch screen), keyboard, joystick, trackball, mouse, microphone for receiving voice input from a user, graphical user interface (GUI), camera, monitor, speaker, printer, laser pointer, head tracker, or any other computer peripheral device, or any combination thereof, capable of entering and/or viewing data or information (e.g. input).

The processing component 70 receives the input from input components 60 and processes the input to provide output to the output component 80. An output component 80 may include, for example, one or more of the following:

recording device for recording and storing the output, a speaker for audio output, or a display for visual output. It is also contemplated that an output component 80 may include a touch screen or GUI, camera, monitor, printer, or any other computer peripheral device, or any combination thereof, capable of outputting and/or viewing data or information (e.g. output).

The processing component 70 receives and processes the input according to one or more programs: a music program 100, a music texture program 300, and a simulation program 500. The processing component 70 also may include a coordinating program 700 that monitors and coordinates the programs 100, 300, 500 into an integrated output. However, it is contemplated that the programs 100, 300, 500 can interact directly with one another without the need for a coordinating program 700. The coordinating program 700 may be used to monitor user activity and coordinate the visual and audio outputs. In addition, the coordinating program 700 may govern the validation and initialization process of the data applications of the invention.

Figure 2:
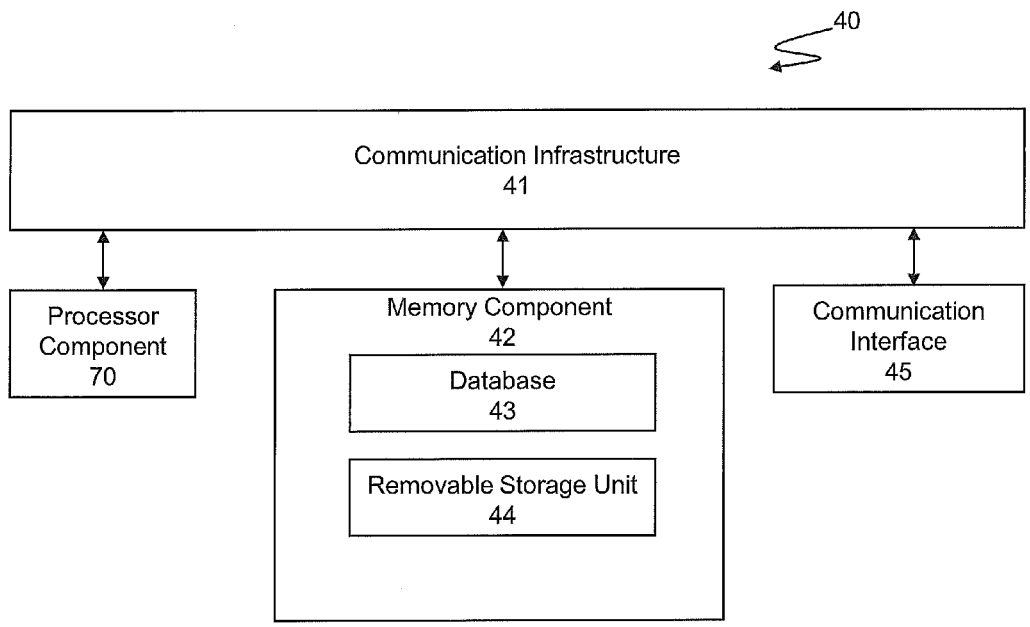
FIG. 2 illustrates one embodiment of an exemplary computer system according to the invention.

The processor component 70 as discussed in reference to FIG. 1 may further be part of a larger computer system structure such as that shown in FIG. 2.

FIG. 2 illustrates an exemplary computer system that may be used to implement the methods according to the invention. One or more computer systems 40 including the processor component 70 may carry out the methods presented herein as computer code. Specifically, the computer system 40 includes a communication infrastructure 41—such as a bus—, which forwards data such as graphics, text, and information, from the communication infrastructure 41 (or frame buffer) to other components of the computer system 40.

The computer system 40 may include one or more processors or processor components 70, which may be a special purpose or a general-purpose digital signal processor that processes certain information. Computer system 40 also includes a memory component 42, for example random access memory (RAM), read-only memory (ROM), mass storage device, or any combination thereof. The memory component 42 may also include a database 43 or a removable storage unit 44, or any combination thereof. Computer system 40 may also include a communication interface 45, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the memory component 42, communication interface 45, or a combination thereof, function as a computer usable storage medium, otherwise referred to as a computer readable storage medium, to store and/or access computer software including computer instructions. For example, computer programs or other instructions may be loaded into the computer system 40 such as through a removable storage unit 44, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 44 to the memory component 42 or through the communication infrastructure 41 to the memory component 42 of the computer system 40.

Communication interface 45 allows software, instructions and data to be transferred between the computer system 40 and external devices or external networks. Software, instructions, and/or data transferred by the communication interface 45 are typically in the form of signals that may be electronic, electromagnetic, optical or other signals capable of being sent and received by the communication interface 45. Signals may be sent and received using wire or cable, fiber optics, a phone line, a cellular phone link, a Radio Frequency (RF) link, wireless link, or other communication channels.

Computer programs, when executed, enable the computer system 40, particularly the processor component 70, to implement the methods of the invention according to computer software including instructions.

The computer system 40 described herein may perform any one of, or any combination of, the steps of any of the methods presented herein. It is also contemplated that the methods according to the invention may be performed automatically, or may be invoked by some form of manual intervention.

The computer system 40 of FIG. 2 is provided only for purposes of illustration, such that the invention is not limited to this specific embodiment. It is appreciated that a person skilled in the relevant art knows how to program and implement the invention using any computer system.

The computer system 40 may be a handheld device and include any small-sized computer device including, for example, a personal digital assistant (PDA), smart hand-held computing device, cellular telephone, or a laptop or netbook computer, hand held console or MP3 player, tablet, or similar hand held computer device, such as an iPad®, iPad Touch® or iPhone®.

Figure 3:
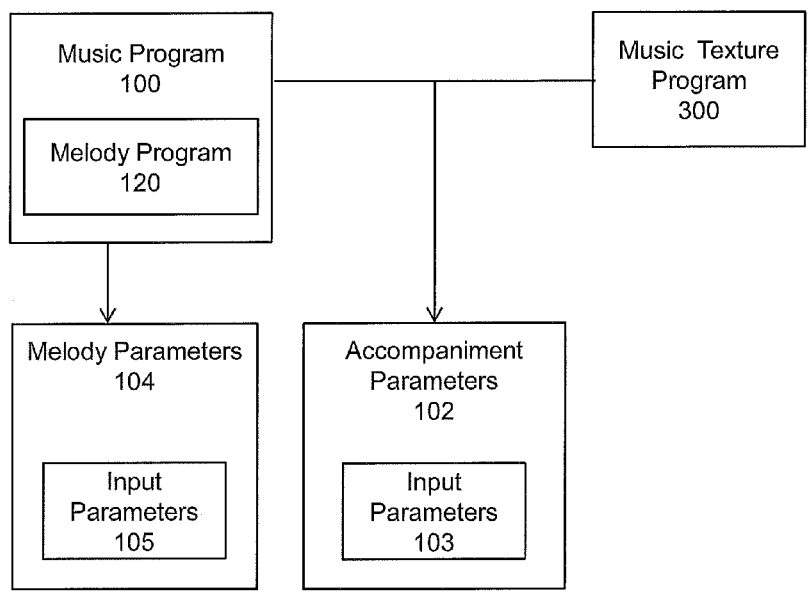
FIG. 3 illustrates the components of a music program according to one embodiment of the invention.

FIG. 3 illustrates the components of a music program according to one embodiment of the invention. The music program 100 is preferably a computer-based system that creates static but ever-changing musical accompaniments and provides users a simple way to play melodies that can conform to those accompaniments. A user can create a melody in real-time that may be played with an algorithmically generated accompaniment.

An accompaniment output according to the invention is defined by parameters 102. Accompaniment parameters 102 include, for example, gain or signal strength, volume, tempo, meter, the tonic, scale, and tuning as created by the music texture program 300. Accompaniment parameters 102 may also include input parameters 103 that determine behavior of the accompaniment parameters 102. The parameters 102 used by the algorithm of the invention are preferably read from files, but it is contemplated that the parameters 102 may be derived from other sources, for example, the Internet.

A melody output according to the invention is defined by parameters 104. Melody parameters 104 include, for example, gain or signal strength, volume, tempo, meter, the tonic, scale, and tuning as created by a user using the melody program 120. Melody parameters 104 may also include input parameters 105 that determine behavior of the melody parameters 104.

It is contemplated that the accompaniment parameters 102 may be created by the melody program 120 in addition to the music texture program 300. Thus, the audio from the music texture program 300 and audio from the melody program 120 may be played individually or in combination. In a preferred embodiment, the accompaniment parameters 102 are created by the music texture program 300, onto which the melody parameters 104 created by the melody program 120 are played.

Figure 4:
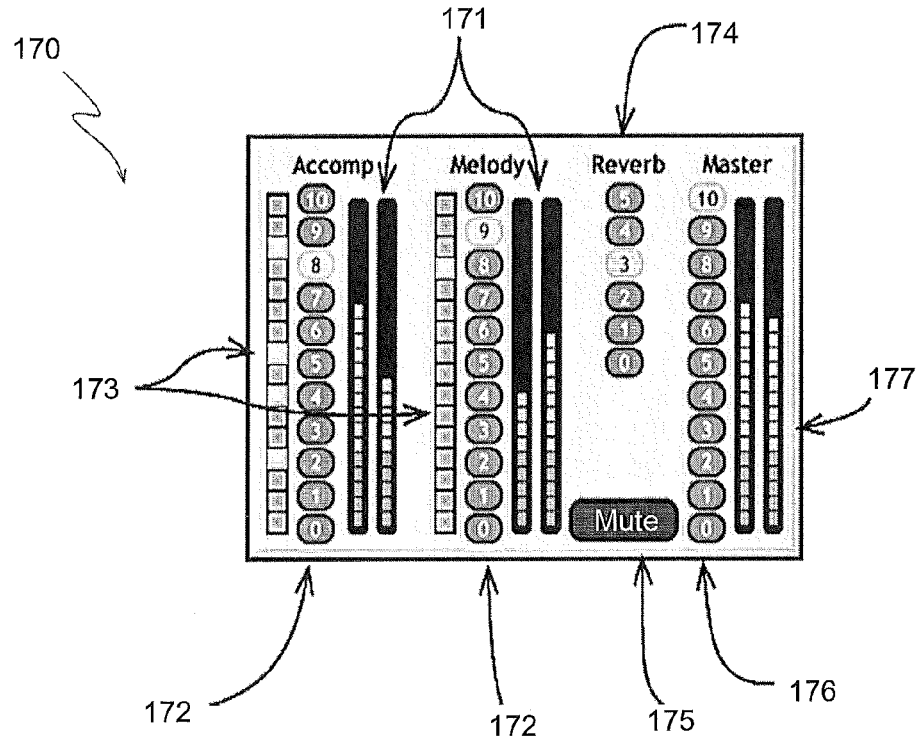
FIG. 4 illustrates one embodiment of a graphical user interface for managing musical parameters according to one embodiment of the invention.

FIG. 4 illustrates one embodiment of a graphical user interface for managing musical parameters according to the invention. Musical parameters include accompaniment parameters and melody parameters as described above. The graphical user interface 170 includes indicators 171 illustrated in the form of a color bar to indicate gain. The interface 170 also includes indicators 172 in the form of a push button for the user to adjust and indicate the sound volume. Indicators 173 are color blocks to indicate the sound note activity.

The interface further includes push button indicators 174 for selection of reverb, push button indicator 175 for mute control, push button indicator 176 for control of the master sound volume (which is a combination of the sound volume for the accompaniment and the sound volume of the melody), and color bar indicator 177 for indication of the master gain (which is a combination of the gain for the accompaniment and the gain of the melody).

In one embodiment, the output component 80 (FIG. 1) are one or more sound modules that convert signals to output music. It is contemplated that signals can be routed to produce output music in a variety of ways with any number of sound modules. For example, reverberation can be independent of the sound modules or the settings of the sound modules can be independent from each other.

Thus, the audio from the music texture program 300 and audio from the melody program 120 may be played individually or in combination. For example, a first sound module can play the music texture program accompaniments while a second sound module can play the melody program melodies optionally created by a user. Embodiments can use any number of sound modules and the association of melody and accompaniment can be configured in any way to any number of sound modules. As an example, sound modules may comprise one or more synthesizers and samplers. The output music can be recorded and stored, for example digital audio files can be housed in a database 43 of a memory component 42 (FIG. 2). In the alternative, the output music may be forwarded to the sound module, for example, Musical Instrument Digital Interface (MIDI) files from an external system. The system can play back recorded audio files upon selection.

Figure 5A:
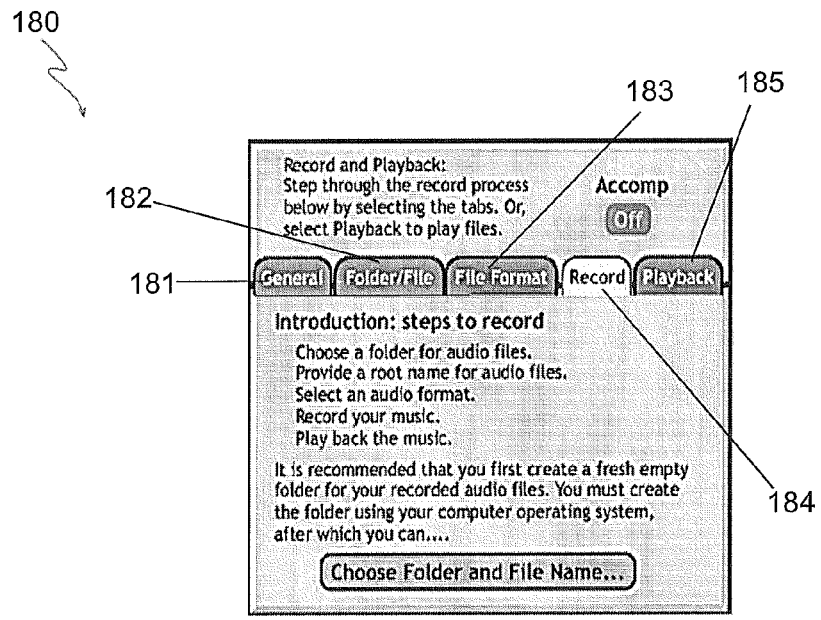
FIG. 5 illustrates graphical user interfaces for recording musical parameters according to one embodiment of the invention.

FIG. 5 illustrates graphical user interfaces for recording musical parameters according to the invention. Specifically, FIG. 5A illustrates a GUI 180 that maximizes the recording quality and minimizes the possibility of user error in recording an audio performance of the music. As shown in FIG. 5A, non-sequentially available options are opened for view by a user as the user chooses an option from a plurality of options. Specifically, a user can select one of the following tabs: the General tab 181 to access and view information or instructions, the Folder/File tab 182 to select a folder and file name, the File Format tab 183 to select a format for the recording such as a MAC or PC file format, the Record tab 184 to record the music to an audio file, the Playback tab 185 to play the recorded audio file.

Figure 5B:
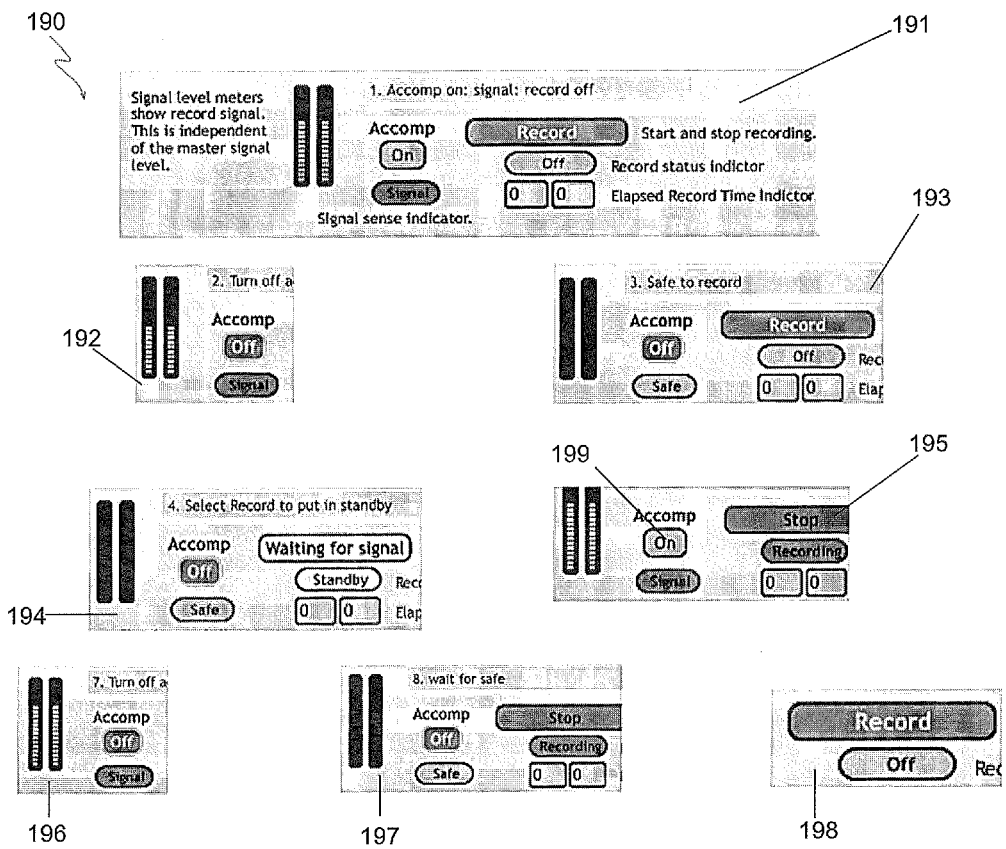

FIG. 5B illustrates a sequence of GUIs 190 illustrating the process of starting and stopping a recording of the system in such a way as to preferably maximize the potential for a clean recording. The first GUI 191 shows the Record Off state before recording and while an accompaniment is active or playing. A user is advised to preferably turn off the accompaniment as shown by GUI 192 to wait for the audio signal to die out as shown by GUI 193. A user is then advised to select the Record state to put the system in a Standby state as shown in GUI 194. A user is then advised to select the Start state as shown by GUI 195 to begin recording the accompaniment and/or melody the user creates. Specifically, recording automatically begins the moment the user selects the accompaniment On state as shown by 199. However, recording may also occur automatically when the user begins to play a melody such that both the accompaniment and user created melody are recorded. When a user is finished recording, GUI 196 advises the user to make sure the accompaniment is off. The audio signal level dies out as shown by GUI 197 before the user is advised to select the Stop state. After the Stop state is selected, the system returns to the Record Off state as shown by GUI 198.

Figure 6:
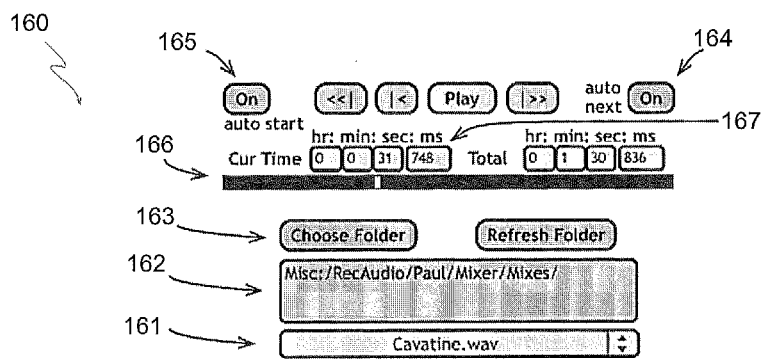
FIG. 6 illustrates a graphical user interface for controlling musical parameters according to one embodiment of the invention.

FIG. 6 illustrates a graphical user interface for controlling musical parameters according to one embodiment of the invention. The graphical user interface 160 includes a drop down file menu 161 that can optionally fill with the names from any file directory 162 including any file directory 163 chosen by the user. However it is contemplated that the file directory most recently selected can be automatically chosen. The auto next option 164 enables the next file in the menu to be automatically selected to play when an audio file finishes playing. The auto start option 165 enables an audio file to start playback automatically once it selected. As an example, if the auto next option 164 and the auto start option 165 are activated or "on", the audio files are played back in the selected directory sequentially, however it is contemplated that the audio files can be played back in any order. Users can optionally locate a particular point in an audio file for playback as shown by scroll bar 166, and/or set a precise numeric start point by entering values within boxes 167.

Figure 7:
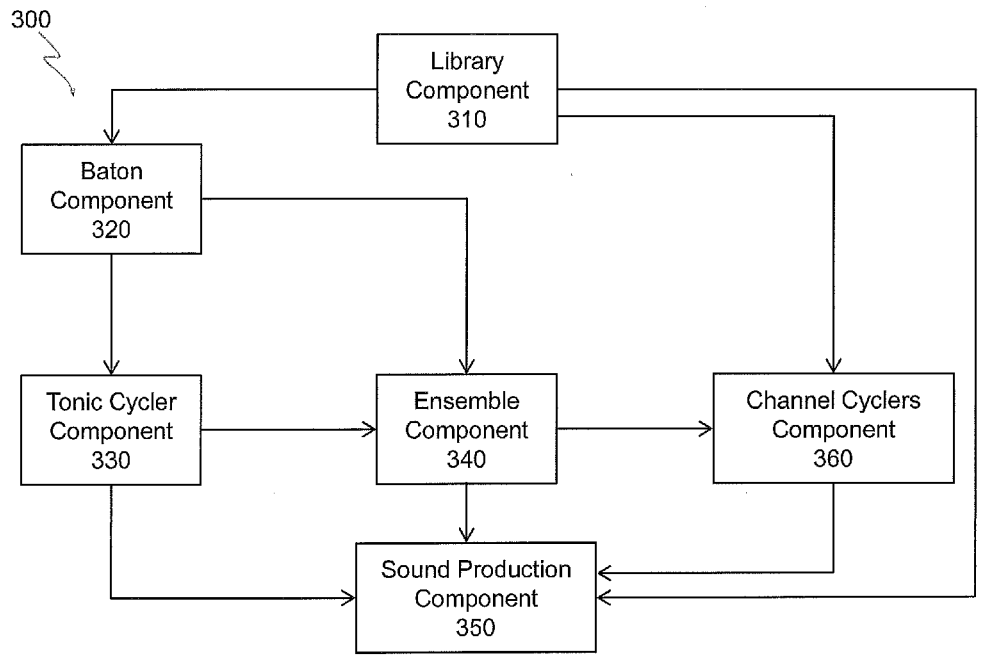
FIG. 7 illustrates the components of a music texture program according to one embodiment of the invention.

FIG. 7 illustrates the components of a music texture program according to one embodiment of the invention. The music texture program 300 algorithmically generates musical accompaniments in real-time. The accompaniments may be uniquely identifiable and further can be selected not to repeat. The music texture program 300 creates the accompaniments using algorithms that perform a plurality of steps.

The music texture program 300 includes a library component 310 that includes accompaniments in the form of saved files. For example, the saved files may be loaded from a file to computer memory or one or more pre-saved files. The music texture program 300 uses an algorithmic music generating system for creating musical accompaniments in real-time. These accompaniments can be uniquely identifiable yet are virtually always changing.

The music texture program 300 includes a baton component 320, a tonic cycler component 330, an ensemble component 340, channel cycler component 360, and a sound production component 350. In addition to creating music, the music texture program 300 may broadcast rhythm and/or scale data to other components that include, but are not limited to those that are part of the music program. Sound production is determined by one or more of the library component 310, the tonic cycler component 330, the ensemble component 340, and the channel cycler component 360.

Figure 8:
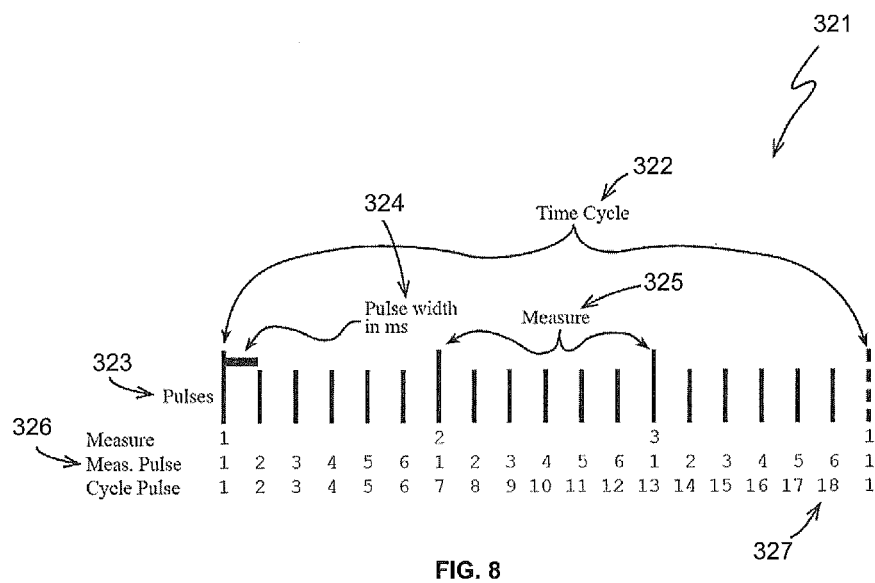
FIG. 8 illustrates the elements of the baton component of the music texture program according to one embodiment of the invention.

FIG. 8 illustrates the elements of the baton component of the music texture program according to one embodiment of the invention. The elements 321 produced by the baton component 320 comprises a time cycle 322, pulse 323, pulse width 324, and measures 325. Baton component 320 can synchronize associated processes by sending triggers or pulses to other components of the music texture program 300 such as to the ensemble component 340 and the tonic cycler component 330 or even external devices.

In this embodiment baton component 320 preferably generates a steady rhythm that is preferably broadcast as a trigger. The pulse width 324 can be determined by a value such as a value representing the time distance between pulses. The pulse width 324 can be constant and/or variable.

The time cycle 322 can optionally be subdivided into shorter cycles and further subdivided into finer subdivisions. As shown in FIG. 8, the time cycle 322 is three short cycles (measures 325) each being comprised of six pulses each 326. This provides a time cycle 322 length of eighteen pulses 327. For each pulse 323, the baton component 320 (FIG. 7) broadcasts details of its position in the cycle and advances its position by one. At the end of the time cycle 322, it returns to the beginning. It is contemplated that the baton component 320 can establish virtually any rhythm. For example, the baton component 320 of the music texture program 300 periodically shifts the tonal center of the music accompaniment by triggering the tonic cycler component 330. In a preferred embodiment, the tonic cycler component 330 outputs a pitch-class of a scale.

An example of a pitch-class of a scale may include a subset of the total twelve-tone pitch class set. In a 12-tone system, the range of possible heptatonic scales is generally 5,544. Virtually any scale size can be utilized. Embodiments can utilize, for example, heptatonic scales comprising from 1 to 38 unique interval arrays and applying two or more orientation operations, retrograde and rotation, to derive 1 to 462 basic scale patterns. Pitches of a scale can optionally be created from an interval array by starting with a tonic pitch class and preferably applying the interval array to derive successive pitches. Scales in this embodiment are preferably derived from a subset generator, but can also be derived by other methods.

Figure 9:
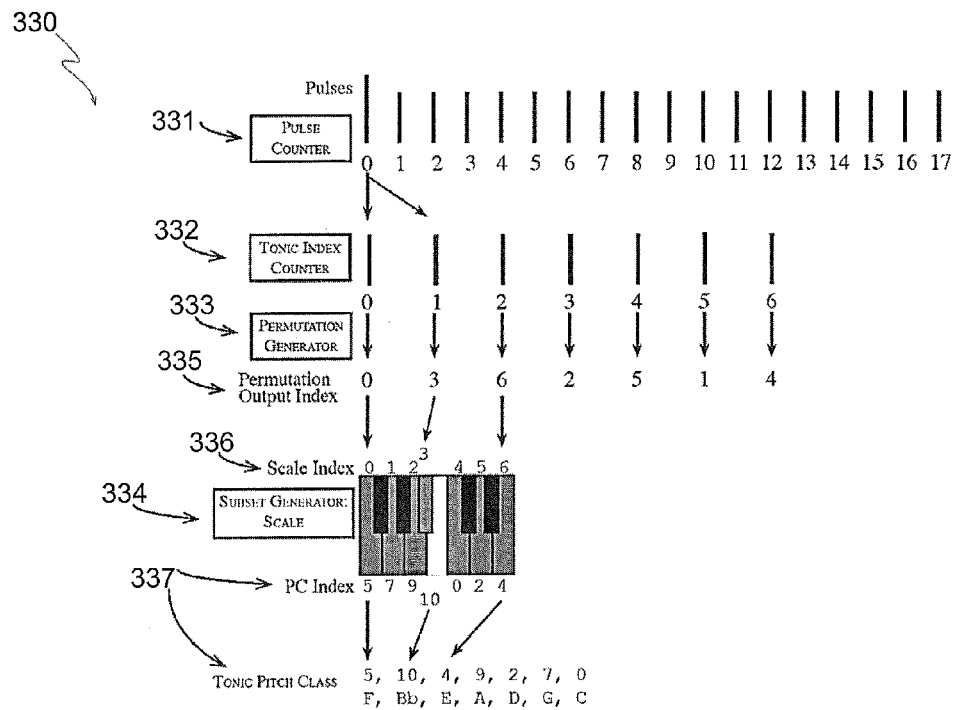
FIG. 9 illustrates the elements of the tonic cycler component of the music texture program according to one embodiment of the invention.

FIG. 9 illustrates the elements of the tonic cycler component of the music texture program according to one embodiment of the invention. The tonic cycler component 330 includes a pulse counter 331, a tonic index counter 332, a permutation generator 333, and a subset generator 334. Each pulse 323 (FIG. 8) advances the pulse counter 331 by one, however, any value is contemplated. The pulse counter 331 can optionally coincide with a time cycle 322 (FIG. 8). When the pulse counter 331 reaches a predefined value, the tonic index counter 332 is advanced by one; however, any value is contemplated. The value of the tonic index counter 332 is provided to the permutation generator 333 to generate an output index value 335. The output index value 335 is provided to the subset generator 334 as a scale index 336. The subset generator 334 preferably outputs a pattern of tonic pitch classes 337, which may be broadcast to other components of the music texture program 300.

Figure 10:
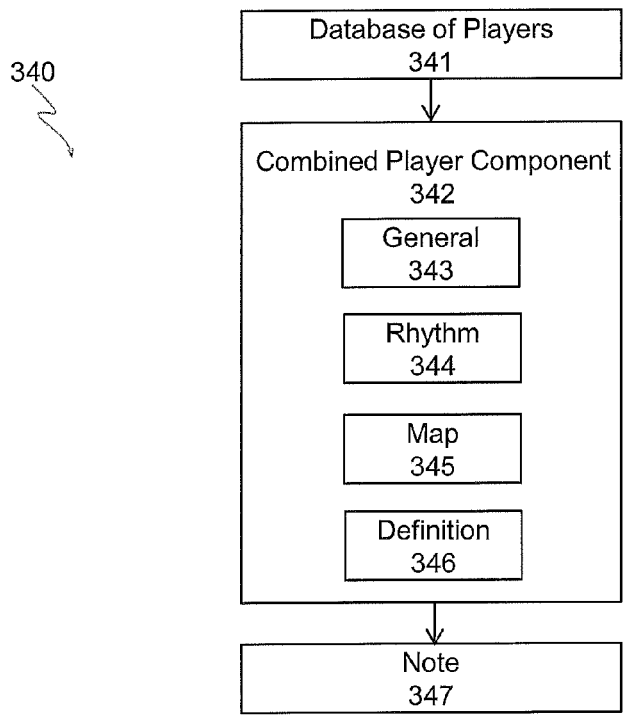
FIG. 10 illustrates the elements of the ensemble component of the music texture program according to one embodiment of the invention.

FIG. 10 illustrates the elements of the ensemble component of the music texture program according to one embodiment of the invention. The ensemble component 340 (FIG. 7) includes a database of players 341. The database of players 341 comprises a group of one or more players that have optionally responded to the same rhythm of the baton component 320 (FIG. 7), which may also be broadcast as a trigger.

The database of players 341 comprise a combined player component 342 that can output a sequence of notes or chords 347 such as those based on internal cycles of rhythm, pitch, and emphasis. Each note 347 is defined by the parameters: pitch value, duration, and velocity (which generally translates to loudness); however, any parameter is contemplated. The combined player component 342 comprises a plurality of parameters: general 343, rhythm 344, emphasis link map 345, and emphasis definitions 346; however, any parameter is contemplated such as fluctuation and random parameters that may assist in generating uniquely identifiable accompaniments that constantly change. General parameters 343 may include, for example, "on/off" toggle, velocity scale, relative note length, pulse mode trigger option, drum option, and channel cycler routing. Rhythm parameters 344 may include, for example, pulse multiplier, pulse subdivision, note length pulse options, and active pulse subset.

Player 342 can receive a pulse length each time a baton component 320 sends its pulse 323. The player component 342 can then either divide or multiply the baton component 320 pulse value to calculate its own pulse length. The player component 342 can also maintain a pulse counter such as a rhythmic pulse counter (RPC) that may advance cyclically with its own pulse. Other than the pulse synchronization, the rhythmic cycle (position and length) of the combined player component 342 can be independent of the rhythmic cycle of the baton component 320. It is contemplated that the cycles can be synchronized on demand. Furthermore, the player 342 can establish a pattern of active and inactive pulses 323. Active pulses may trigger an event for further processing. It is contemplated that a subset generator 334 can optionally be used to create a rhythm pattern comprised of a list of active pulses. Active pulses can preferably be linked to an emphasis link map 345 that determines which emphasis definitions 346 to use to generate each note.

Figures 11, 12:
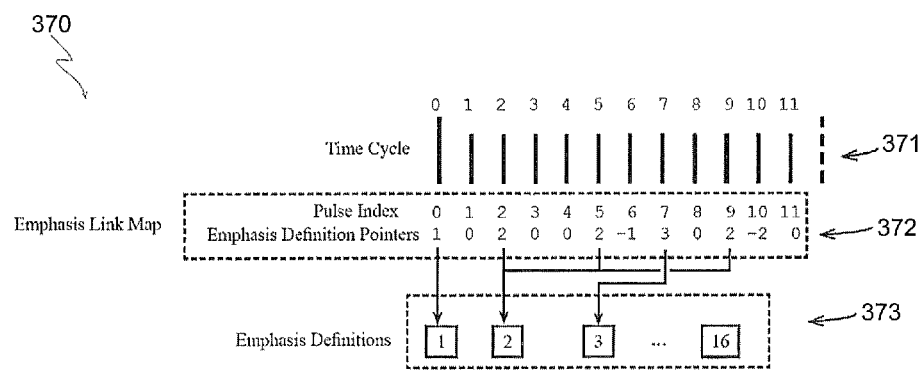
FIG. 11 illustrates the elements of an emphasis link map parameters of the combined player component according to one embodiment of the invention.
FIG. 12 illustrates an embodiment of a pulse rhythm method for interpreting a link map according to the invention.

FIG. 11 illustrates the elements of an emphasis link map parameters of the combined player component according to one embodiment of the invention. The embodiment shown in FIG. 11 illustrates how emphasis link maps 345 are interpreted given a maximum of 64 link cells. When the rhythm cycle length is from approximately 1 to 16 pulses as shown by 301 in FIG. 11, a column of 4 links can be simultaneously active, preferably allowing up to four notes to be generated at a time. When the rhythm cycle is between 17 and 32 pulses as shown by 302 in FIG. 11, two links can be simultaneously active, preferably allowing up to two notes to be generated at a time. When the rhythm cycle is between 33 and 64 pulses as shown by 303 in FIG. 11, one note can be generated at a time. In other embodiments, there are no restrictions to the number of pulses in a cycle or the number of notes that can be simultaneously generated by the combined player component 342 for any pulse.

Figure 13:
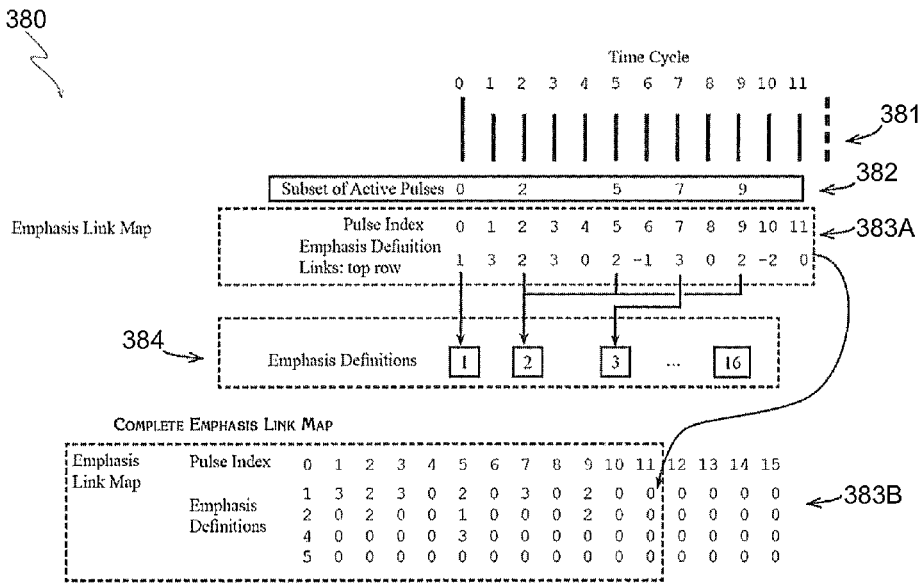
FIG. 13 illustrates an embodiment of a trigger pulse rhythm method for interpreting a link map according to the invention.
Figure 14:
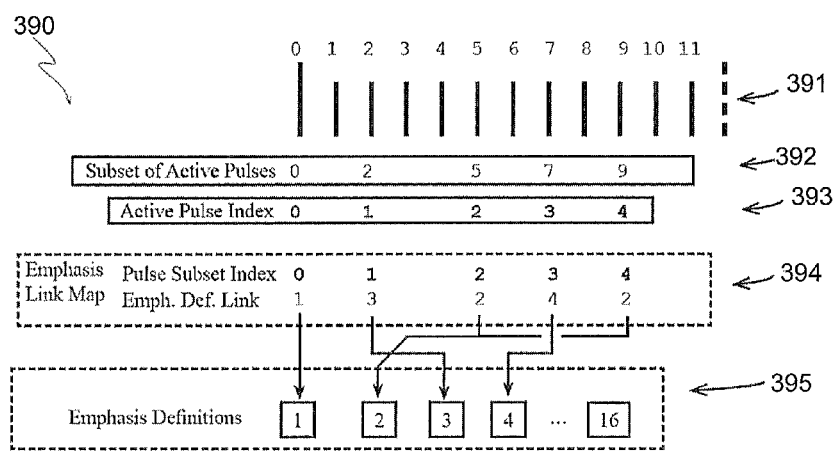
FIG. 14 illustrates an embodiment of a trigger rhythm method for interpreting a link map according to the invention

The emphasis link map 345 is interpreted using one of three methods: a pulse rhythm (FIG. 12), a trigger pulse rhythm (FIG. 13), and a trigger rhythm (FIG. 14).

FIG. 12 illustrates an embodiment of a pulse rhythm method for interpreting a link map according to the invention. A pulse rhythm method 370 preferably comprises time cycle 371, emphasis link map 372 and emphasis definition 373. The pulse rhythm method 370 links values to emphasis definitions and active pulses are denoted preferably by non-zero values. Zero values denote pulses of no note activity. As the time cycle 371 counts through the pulse index, values in the emphasis link map 372 point to one or more emphasis definitions 373 to generate one or more notes. Negative values in the emphasis link map 372 may extend a previously assigned active note through one or more pulse lengths.

A 12-pulse cycle is shown in FIG. 12 with the emphasis link map 372 set to pulse which means that every rhythmic pulse is checked against the emphasis link map 372 for potential emphasis definitions 373. As shown, pulse indices 0, 2, 5, 7, and 9 point to an emphasis definition 373. Pulses 1, 3, 4, and 8 are silent. Notes generated at pulse 5 extend through 6 as indicated by the value −1 at pulse 6, and notes generated at pulse 9 extend through the rest of the 12-pulse cycle as indicated by the value −2 at pulse 10.

FIG. 13 illustrates an embodiment of a trigger pulse rhythm method for interpreting a link map according to the invention. The trigger pulse rhythm method 380 includes a time cycle 381, a subset of active pulses 382, emphasis link maps 383A, 383B, and emphasis definitions 384. The pattern of the trigger pulse rhythm method 380 can be calculated using a subset generator that preferably creates a list of active pulses 382. The emphasis link map 383A—selected from the complete emphasis link map 383B—can link these pulses to emphasis definitions 384. In this mode, active pulses 382 can be those calculated with one or more positive values in the emphasis link map 383A at the pulse index corresponding to active pulses 382. A 12-pulse cycle is shown in FIG. 13 with an interval array of u12:5-37: m3<2322:3> to generate the active pulse 382 shown as subset [0,2,5,7,9].

FIG. 14 illustrates an embodiment of a trigger rhythm method for interpreting a link map according to the invention. The trigger rhythm method 390 includes a time cycle 391, a subset of active pulses 392, a pulse index 393, an emphasis link map 394, and emphasis definitions 395. The pattern of the trigger rhythm method 390 can be calculated using a subset generator that preferably creates a list of active pulses 392, which can be linked to emphasis definitions 395 through the emphasis link map 394. In this mode, active pulses can be those calculated in the subset of active pulses 392 with one or more positive values in the emphasis link map 394 at the pulse index 393 corresponding to the subset of active pulses 392. A 12-pulse cycle is shown in FIG. 14 with an interval array of u12:5-37:m3<2322:3> to generate the active pulse 382 shown as subset [0,2,5,7,9].

FIG. 15 illustrates an embodiment of pitch class generation according to one embodiment of the invention. According to the invention, a pitch class generation method 110 preferably comprise a pitch class index value using a counter, permutation generator, and two nested subset generators: including but not limited to one to preferably calculate a scale and one to calculate a subset of the scale (e.g. chord). Embodiments of the counter can bypass the permutation generator and directly activate either the chord stage and/or scale stage of the process chain. Normally, each time the generator is activated, the counter is advanced with the output fed into the permutation generator or one of the subset generators. However, other behaviors are supported with pitch options in the emphasis definition that may alter the behavior of the counter or impose a value somewhere in the chain. Embodiments comprise the normal calculation chain that can begin with the counter and end with a pitch class index generation method 110. Turning to FIG. 15, a three-note triad is the desired output. As shown at 111, the index is used as the input. The counter index is sent to the permutation generator at 112. The permutation output is used as the input to the chord subset generator at 113. The chord subset generator is defined at 114. At 115 the permutation generator produces an ordered set and the scale subset generator is parameterized at 116. The unordered subset is mapped to a musical scale at 117. The output for the chord permutation is determined at 118 which cycles through the ordered pitch class set at 119.

According to the invention, scales may be transposed utilizing a pitch class index received from an external source such as the tonic cycler component 330 (FIG. 9). Similarly, chords may be transposed utilizing subsets of scales; notes of a chord can preferably conform to their parent scale.

FIG. 16 illustrates the elements of the channel cycler component of the music texture program according to one embodiment of the invention. The channel cycler component 360 includes a counter 361, a permutation generator 362, and a sound module link 363 that points to a sound module 364. Each time the channel cycler component 360 receives a note or notes it advances the counter 361, which outputs an index value that can be fed into the permutation generator 362. Output from the permutation generator 362 is sent to the sound module link 363, which points to a sound module 364. According to the invention, any number of sound module links 363 is contemplated. As shown in FIG. 16, sound module 364 includes one or more audio outputs 365 and one or more instrument channels 366. The sound module 364 is set up to send successive notes or chords to a quadraphonic spatial pattern. Audio signal output 365 from the sound module 364 is routed to output component such as speakers. The instrument channels 366 play instrument patches (e.g. harpsichord, marimba, piano, and violin). Instrument channels 366 can be utilized such that they are individually or collectively routed to different output components. Sound module links 363 point to each of instrument channel 366 in sequence. Notes from players are distributed successively to each of the channels 366 as the counter 361 advances and its index is directed to a sound module link 363 via the permutation generator 362.

Figure 17:
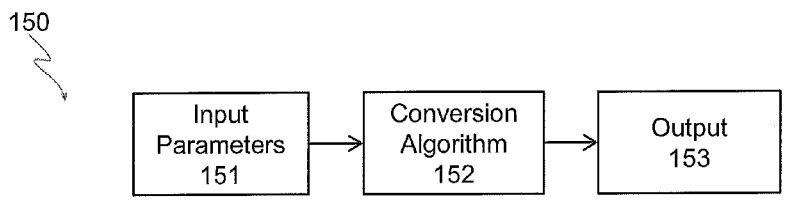
FIG. 17 illustrates the elements of a tuning component of the music texture program according to one embodiment of the invention.

Certain embodiments of the music texture program 300 may include a tuning component 150 to tune members of a scale. As shown in FIG. 17, the tuning component 150 comprises input parameters 151 subjected to a conversion algorithm 152 to provide output 153. According to one embodiment, the tuning component 150 comprises input parameters 151 directed to a note value and microtonal offset. The note value can be a single value or a pitch-class, or a register pair that represents the note value. Input parameters 151 are subjected to a conversion algorithm 152 that converts pitch to frequency such that the output 153 is a frequency value. According to another embodiment, the tuning component 150 comprises input parameters 151 of a frequency value. The conversion algorithm 152 in this case converts frequency to pitch such that the output 153 is a value or values representing the pitch class, register pair with an additional microtonal offset. The offset can represent the error difference between the closest frequency that can result for the closest pitch, and the actual output frequency. For example, if a pitch class represents a particular frequency, a slightly higher frequency falls closest to the same pitch class but has a positive microtonal offset. Yet according to another embodiment, the tuning component 150 provides an output 153 of a block of data representing microtonal deviations from the sound module's standard tuning.

Figure 18:
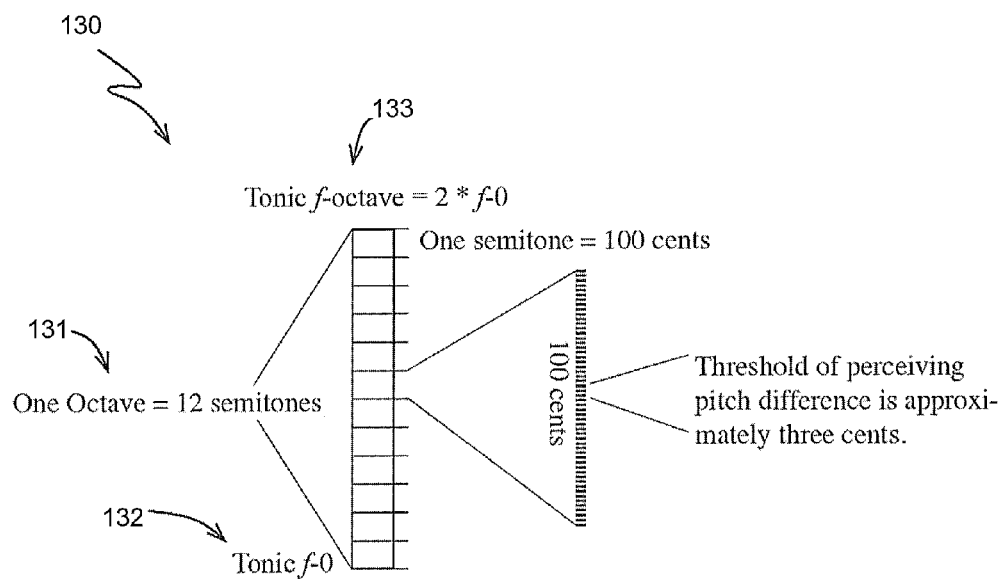
FIG. 18 illustrates parameters of the tuning component according to one embodiment of the invention.

FIG. 18 illustrates an embodiment including parameters of the tuning component. The parameters 130 establish the number of scale members 131 and the ratio between a tonic frequency 132 and the next higher tonic frequency 133. This ratio can be approximately 2:1, but may be any ratio n:d where n is greater than d for an ascending system and n is less than d for a descending system. In one embodiment, the number of scale steps is preferably 12 to reflect the Western twelve-tone equal-tempered scale, but may be any size preferably greater than 1. When the scale size is 12 and conforms to a twelve-tone system, these scale steps may be referred to as semitones or half steps. In a system in which the number of scale steps is 24, these may be referred to as quartertones or quarter steps. It is contemplated that the parameters may be based on any applicable scale/octave system.

Figure 19:
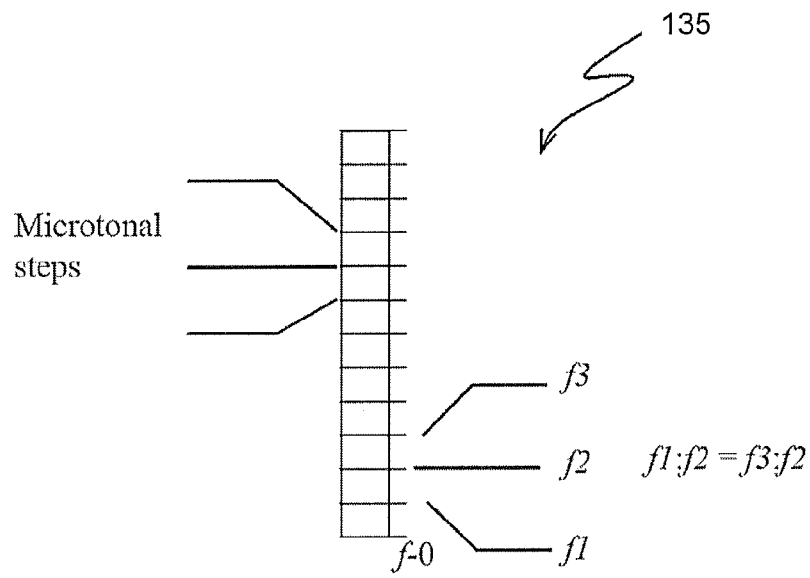
FIG. 19 illustrates an embodiment of the tuning component including establishment of an equal-tempered microtonal reference scale according to the invention.

The tuning component 150 can be further defined by establishing an equal-tempered microtonal reference scale 135 as shown in FIG. 19, which illustrates that each microtonal step is approximately the same frequency ratio as the next step. In this embodiment of the invention the octave can be divided by any non-zero value. It is contemplated that the tuning component 150 may comprise a different microtonal octave division for the input stage than the one used for the output stage. For example, the input system may use a 72-division system while the output may use a 1200 division system.

Figure 20:
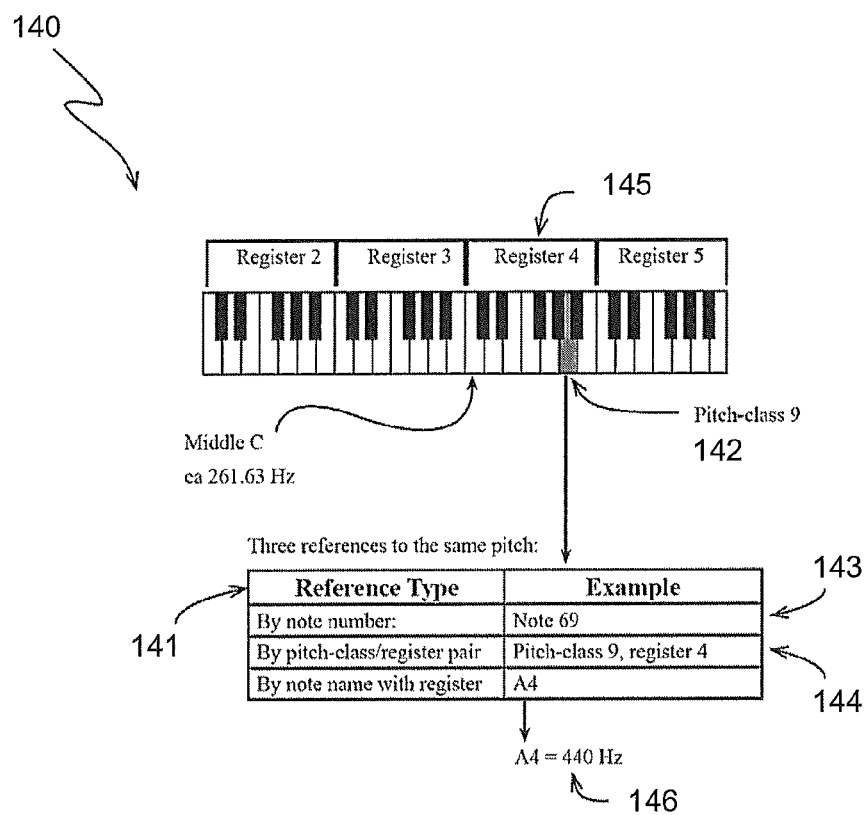
FIG. 20 illustrates scale tuning reference values according to one embodiment of the invention.
Figure 21A:
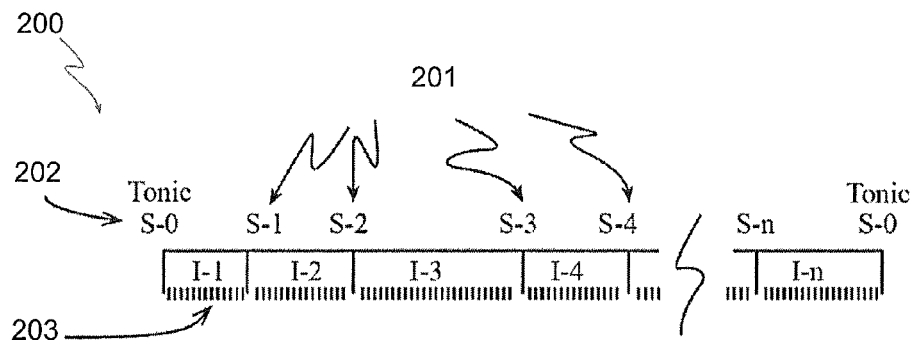
FIG. 21 illustrates various methods for establishing the pitch class tuning according to the invention.
Figure 21B:
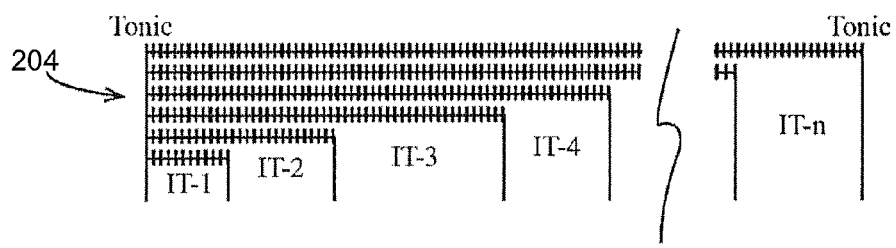
Figure 21C:
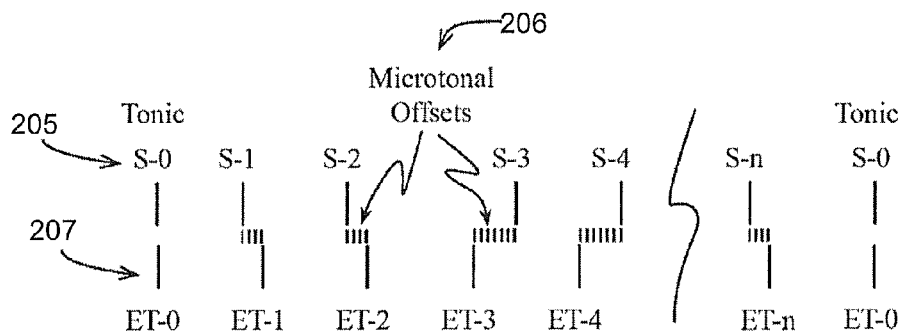
Figure 21D:
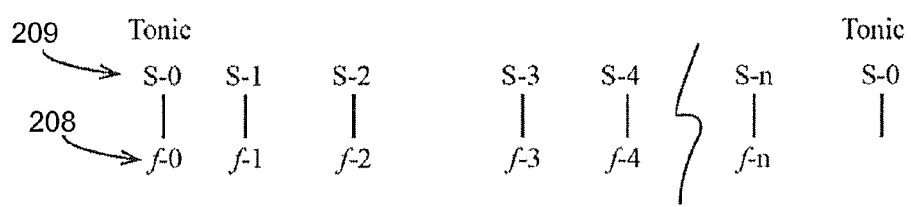

FIG. 20 illustrates scale tuning reference values according to one embodiment of the invention. The scale tuning reference values 140 include reference types 141 to illustrate reference notes. A note 142 is preferably linked to a frequency value 146. Thus, the reference to note 142 can be provided as a single numeric value 143 based on a predefined number system, or as two values representing a pitch-class 144 and register 145. These linked values can then be used to preferably calculate the values of the tuning system.

FIG. 21 illustrates various methods for establishing the pitch class (scale) tuning according to the invention. As illustrated in FIG. 21, various methods 200 can establish pitch class (scale) member tuning using intervals comprised of a number of input microtones. FIG. 21A illustrates scale members 201 calculated from a succession of microtonal intervals 203 starting at the tonic 202. FIG. 21B illustrates each scale member separately established by an interval of microtones from the tonic 204. FIG. 21C illustrates the scale members 205 calculated from a microtonal offset 206 from the same members of an equal-tempered version of the scale 207. FIG. 21D illustrates a method in which each scale member is calculated by providing a predetermined frequency 208 for the scale member 209 in the reference register.

Figure 22A:
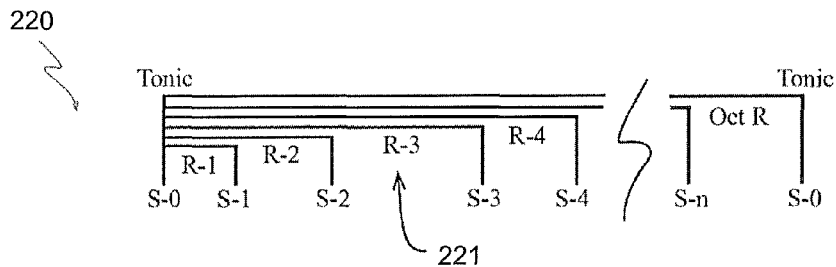
FIG. 22 illustrates various methods for calculating each scale member using frequency ratio values according to the invention.
Figure 22B:
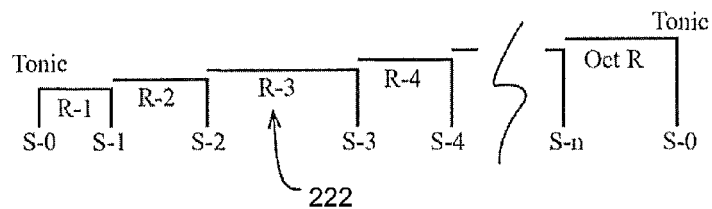
Figure 22C:
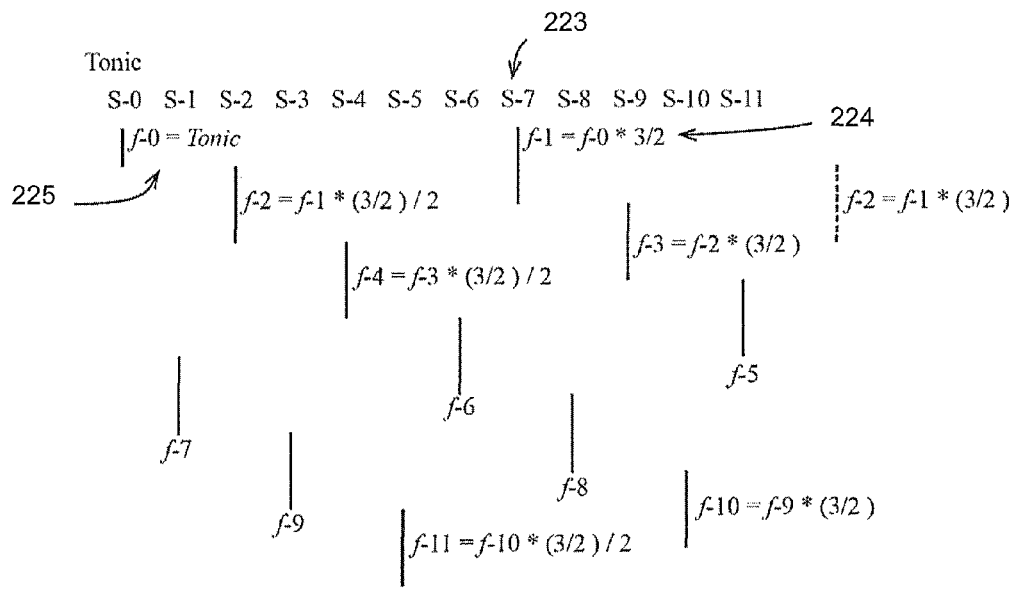

FIG. 22 illustrates various methods for calculating each scale member using frequency ratio values according to the invention. As illustrated in FIG. 22, various methods 220 to calculate each scale member using frequency ratio values. One such tuning can calculate each scale member based on its frequency ratio relative to the tonic 221 as shown in FIG. 22A, however, any scale member is contemplated. Another ratio tuning is shown in FIG. 22B in which each scale member is calculated using ratios between successive adjacent scale members 222. FIG. 22C illustrates another embodiment in which each scale member is calculated by applying one or more ratios accumulatively to non-adjacent scale members 223. For example, the Pythagorean tuning, which is based on a circle of 3:2 ratios, can be derived by accumulative application of a 3:2 ratio as shown by 224 starting with the tonic 225 until as many pitch classes have been calculated as needed, generally 12, but any number is possible.

As shown in FIG. 22C, the following ratios are obtained with f-0 as the tonic until the pitches have been calculated.

$f\text{-}1 = f\text{-}0 * (3/2) = 3{:}2$ $f\text{-}2 = f\text{-}1 * (3/2) = 9{:}4$ divide 9:4 by 2 to keep the value between 1.0 and 2.0

$f\text{-}2 = 9{:}8$ $f\text{-}3 = f\text{-}2 * (3/2) = 27{:}16$ $f\text{-}4 = f\text{-}3 * (3/2) = 81{:}32$ divide by 2 to keep the value between 1.0 and 2.0

$f\text{-}4 = 81{:}64$

A preferred embodiment establishes a scale tuning that can define the interval relationships between scale members preferably within one octave and preferably starting on a tonic. Interval relationships can be fixed even though the actual frequencies may shift according to other parameters (such as those discussed more fully below).

Figure 23:
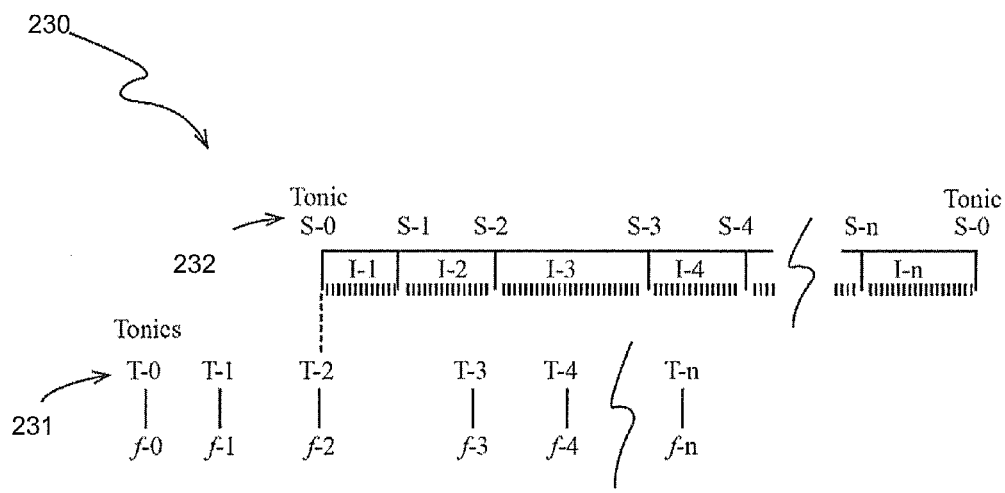
FIG. 23 illustrates moving the tonic according to one embodiment of the invention.
Figure 24:
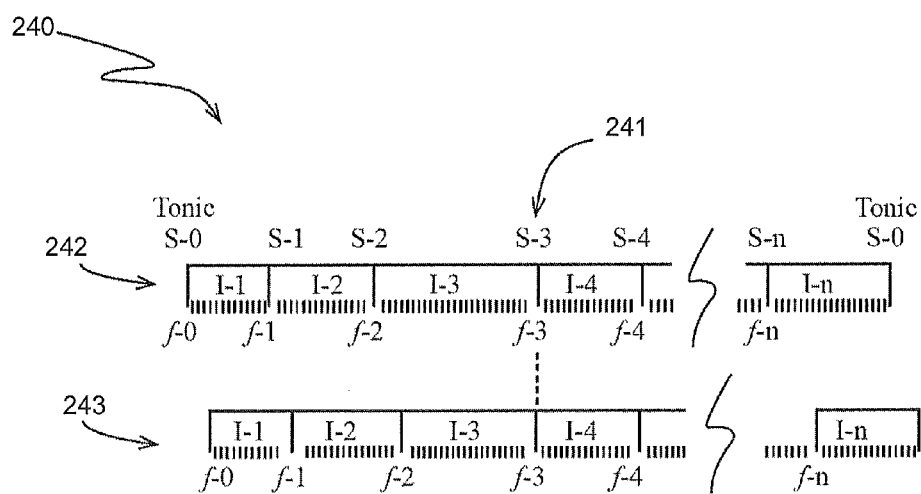
FIG. 24 illustrates holding a scale member while other scale members change according to one embodiment of the invention.

Some embodiments of the invention comprise predetermined pitch-classes that can be used as the tonic 230 as shown in FIG. 23 and the tonic 240 as shown in FIG. 24. Specifically, FIG. 23 illustrates moving the tonic according to one embodiment of the invention and FIG. 24 illustrates holding a scale member while other scale members change according to one embodiment of the invention.

As shown in FIG. 23, a second scale tuning 231 may be established that can be used to move the tonic 232. However, any method can be used to establish the tonic scale and there is no restriction to the method for determining the tonic frequency.

As shown in FIG. 24, a pitch class 241 is held—which may or may not be the tonic—at a virtually constant frequency while the others are preferably adjusted according to the input parameters. Whenever a tonic frequency is established, the frequencies of the reference scale members can be calculated based on the previously calculated interval relationships. FIG. 24 illustrates scale tuning 242, 243 for which a scale member 241 is held, while other scale members change according to their respective established tuning systems.

Figure 25:
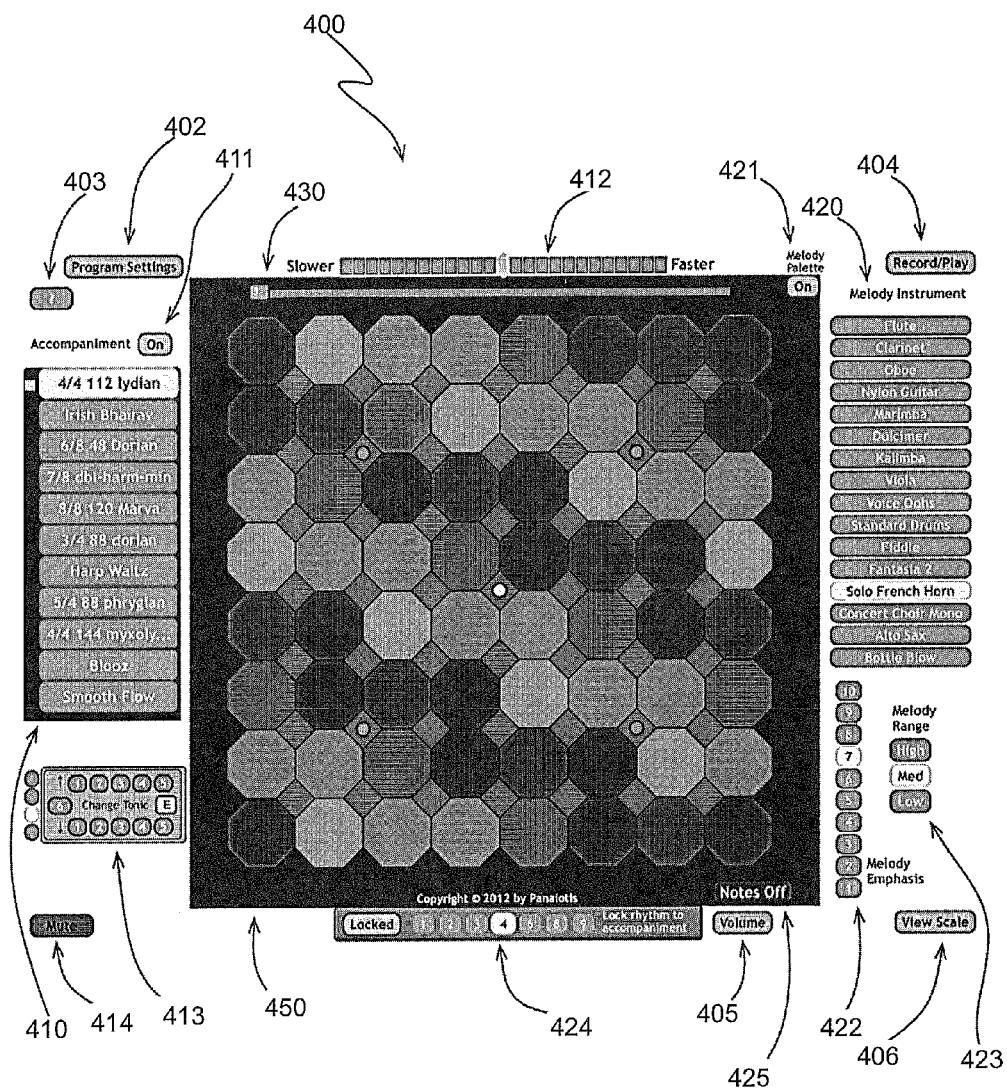
FIG. 25 illustrates one embodiment of a graphical user interface of the music program according to the invention.

One form of an input component 60 (FIG. 1) is illustrated in FIG. 25. FIG. 25 illustrates a GUI 400 to select one or more melody parameters created by the melody program. The melody parameters 104 (FIG. 3) created by the melody program 120 are played along with the accompaniment parameters 102 created by the music texture program 300 (FIG. 1).

The GUI 400 for creating a melody, that preferably can be done in real-time, is designed to virtually eliminate the need for pre-knowledge or understanding of the musical structure of the accompaniment.

FIG. 25 illustrates one embodiment of a graphical user interface of the music program according to the invention. The GUI 400 preferably comprises a variety of features including: program settings 402, "help" feature 403, record/playback 404, volume control 405, and view scale 406. When selecting the view scale 406 feature, it is contemplated that a pop-up window is enabled that includes settings, views and options for the scale.

The GUI 400 as shown in FIG. 25 includes a variety of input elements. A melody palette 450 includes a grid of octagons and diamonds that the user can optionally access to play melodies along with the accompaniment. The GUI 400 also includes settings for control of the accompaniment parameters and melody parameters. The accompaniment settings include, for example, selector 410, "on/off" toggle 411, tempo control 412, tonic control 413, and mute 414. The melody settings include, for example, instrument selector 420, "on/off" toggle 421 for the melody palette, melody emphasis 422, melody range 423, lock melody rhythm to accompaniment 424, and notes off 425. The GUI 400 also includes a time cycle indicator 430.

Octagons and diamonds visually represent an association between user input and an intended action. For example, the association of melody palette 450 octagons can preferably correspond to an association with musical notes of a scale to play melodies. Selecting an octagon preferably turns on the associated note. Deselecting the octagon preferably turns off the associated note.

Input elements of the GUI 400 may include any indicator, icon, virtual button, push button, scroll bar, turn dial, or illustration appearing on a user interface. In addition to the standard method of making the selection by clicking a mouse or key on a keyboard, selection may also be performed using a point and hover mechanism that activates an input element by lingering a pointer over the input element. User selection of octagons and/or diamonds may change the visual characterization of the input element to indicate that it has been selected. For example, the octagon fill color may be brighter, or the border may change color.

The lock melody rhythm to accompaniment 424 works by calculating two sets of time domain windows given a pulse and a pulse length: (1) pulse windows near the pulse and pulse subdivision, during which user note activity events are processed without change and (2) delay windows between pulses and pulse subdivisions in which user events are not processed until the next pulse window.

The record/playback 404 may have a variety of features including: (1) automatically start playback when an audio file is selected, (2) automatically advance to next file when a file reaches the end, (3) refresh the menu list of files in the chosen directory, (4) choose an audio file directory by drag/dropping a directory into a particular area, (5) navigate to a specific folder, (6) select a file from the dropdown menu to play it, (7) set a precise playback position, (8) select the previous file in the audio file menu, (9) move to the start of the currently selected file, (10) play and pause playback, (11) select the next file in the audio file menu, (12) click and drag an indicator to move through the file.

Figure 26A:
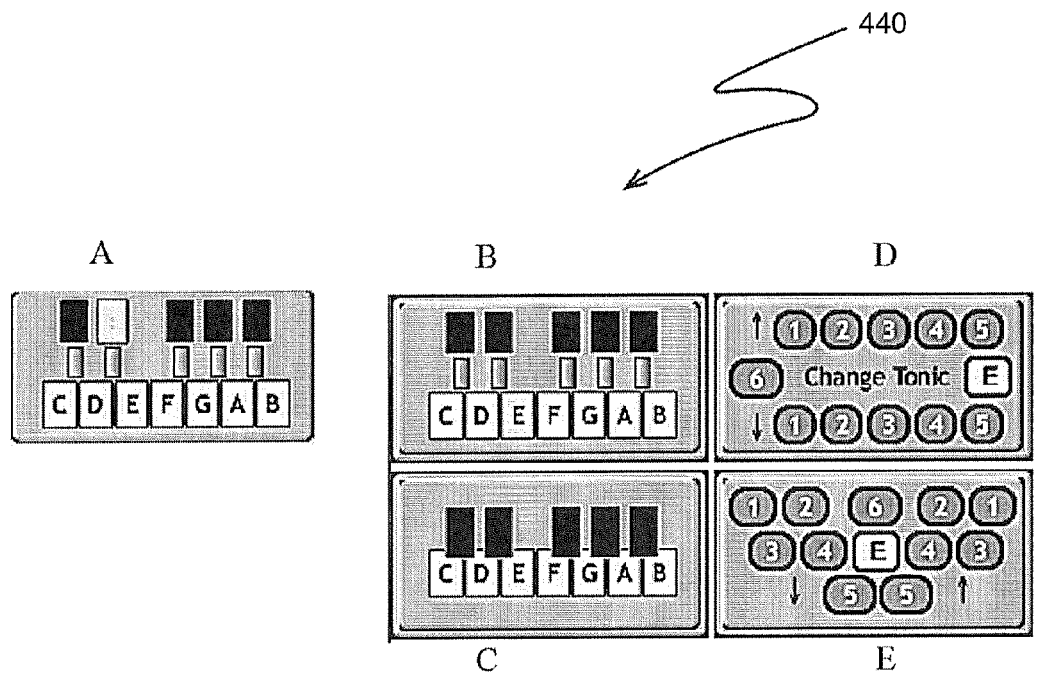
FIG. 26 illustrates selection using a point and hover mechanism according to one embodiment of the invention.
Figure 26B:
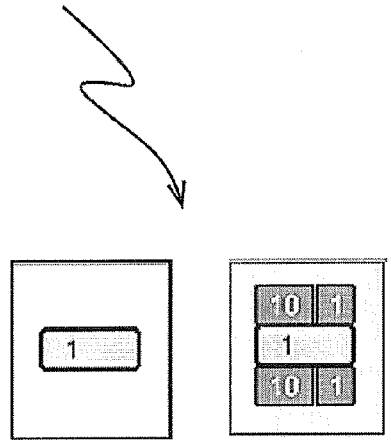

FIG. 26 illustrates selection using a point and hover mechanism according to one embodiment of the invention. More specifically, FIG. 26A illustrates activating the tonic pitch class 440 by lingering a pointer over the tonic control 413 (FIG. 25). When activated, a plurality of windows open allowing the tonic pitch class to be adjusted. FIG. 26B illustrates activating a number scroll bar 445 by lingering a pointer over a number box such as to expand the box to reveal increment and decrement controls by any value (i.e., one, ten, etc.)

Figure 27:
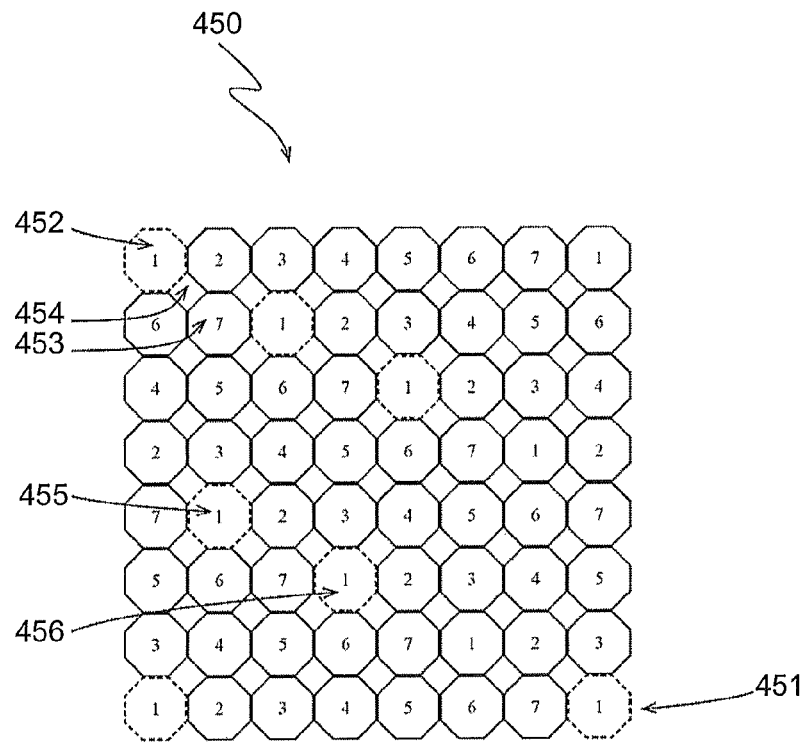
FIG. 27 illustrates an embodiment of a melody palette according to one embodiment of the invention.

FIG. 27 illustrates an embodiment of melody palette 450 (also referred to as "octagon grid"). A user manipulates the melody palette 450, which is represented as a grid 451 of regular octagons in parallel formation that can be orthogonally arranged in rows and columns. In the grid 451, diagonally adjacent octagons 452 and 453 can form a space that results from the geometry of the octagons and their orthogonal relationship. This space can geometrically form any shape, however, as shown in FIG. 27, the space is a square, rotated off-axis by 45 degrees, and hereafter referred to as a diamond 454. As shown, there are eight rows 455 and eight columns 456 of adjacent non-overlapping regular octagons orthogonally aligned in an 8×8 grid, although any configuration is contemplated. The octagons are selected either individually or in combination simultaneously.

In one embodiment, the diamonds 454 can preferably be used as areas of silence, allowing a user to move off of any octagon to stop a note without starting a new one. However, diamonds 454 can also be assigned to particular chords, or a specific musical instrument selection. Adjacent octagons from left to right preferably ascend a scale by one scale step. The actual notes (pitches) can be governed by a scale and tuning system defined in an accompaniment.

Alternative embodiments include a grid in which multiple notes, chords, text and/or images can be assigned to each octagon. Alternatives include melody context remapping that changes row and column orientation, so ascending (for example) is by scale step, and movement to the right or left is by skip. In addition, while the preferred embodiment shows heptatonic scales, any scale of any number of pitches may be represented, including multiple octave scale.

Figure 28:
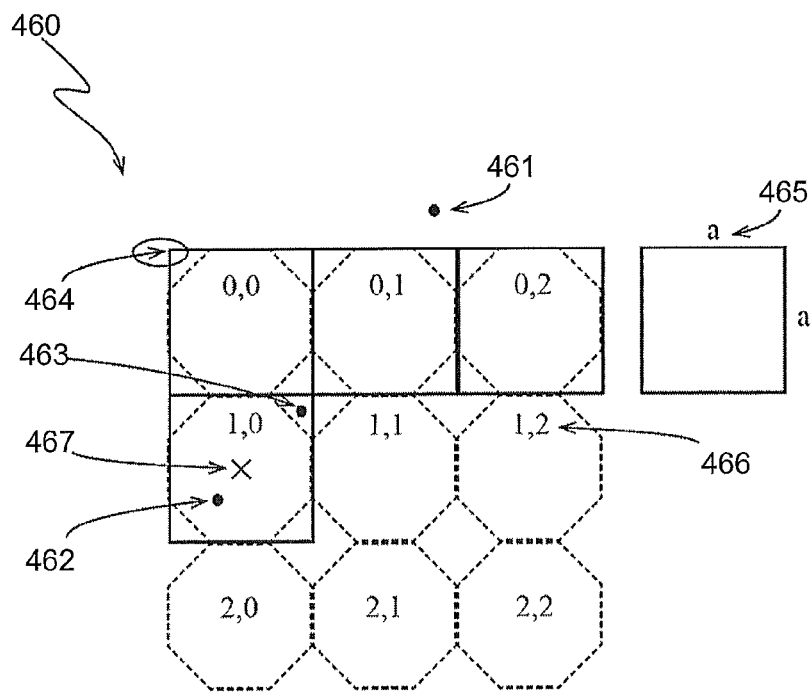
FIG. 28 illustrates component tracking of the melody palette according to one embodiment of the invention.

FIG. 28 illustrates component tracking of the melody palette according to one embodiment of the invention. Component tracking 460 translates pointer coordinates to an octagon and/or diamond index. A pointer can be located outside the grid as shown by 461, in an octagon as shown by 462, or in a diamond area as shown by 463. From a point of origin 464, a grid of squares circumscribing each octagon in a grid of orthogonally arranged octagons can be used to calculate which square, if any, a point is located by dividing the difference coordinates of location and point of origin by length of a side of a square 465, providing a row and column index value 466. This results in locating a point outside the entire grid 461, or locating it in an octagon 462, or in a diamond 463. Determining if the point is in an octagon can be accomplished using a point-inside-polygon algorithm. If, after calculation, the point is not inside the octagon 462, then a difference algorithm from center of square 467 can be used to calculate in which diamond the point is located 463.

More specifically, the octagon or diamond the pointer was selecting was calculated using the following process: (1) considering one corner of the grid represented the coordinate [0, 0], the selection location relative to the origin is [x, y], (2) knowing the total size of the grid, the procedure checks the selection location to determine if it is inside the grid. If it is not, the process exits with nothing selected, (3) the length of the side of a circumscribed square is 'a' which results in the column index as the integer part of (x/a) and the row index as the integer part of (y/a). Five possibilities remain including the point residing in the octagon circumscribed by the square at index [row, column], or the point residing in one of the four diamond areas representing the space between octagons. In summary, using coordinates of the nodes of the circumscribed octagon, a point-inside-polygon algorithm is applied to determine if the point is inside the octagon. If it was, the task was complete. If the point is outside the octagon but inside the grid, it has to be in one of the diamonds partially enclosed by the circumscribed square. The diamond in which the point is located is determined by subtracting the x and y coordinates of the selection point from the center coordinates of the circumscribing square. The combination of negative and positive results indicates which diamond the selection point occupied.

Figure 29:
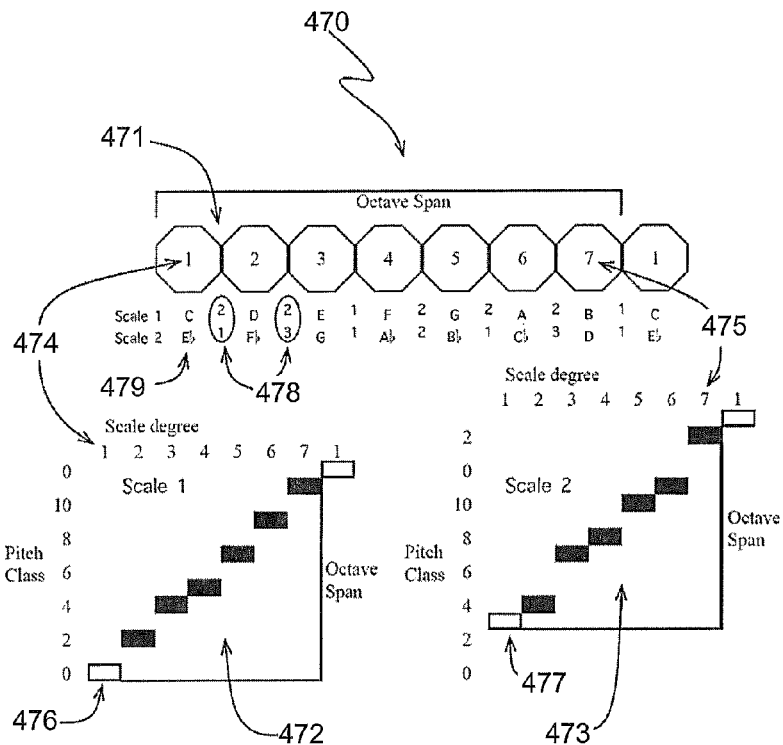
FIG. 29 illustrates one embodiment of a scale association of the melody palette according to one embodiment of the invention.
Figure 30:
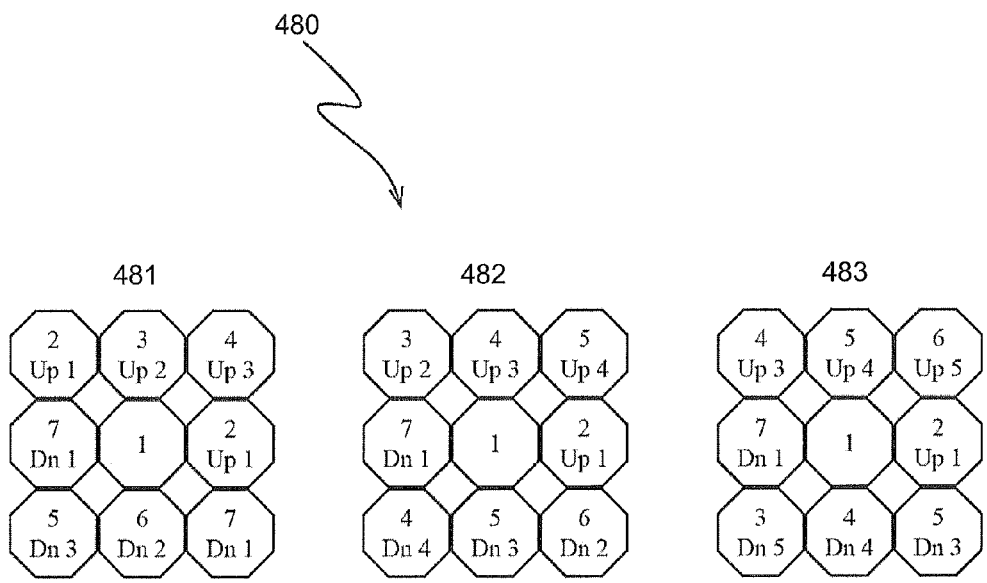
FIG. 30 illustrates one embodiment of a scale association of the melody palette according to another embodiment of the invention.
Figure 31:
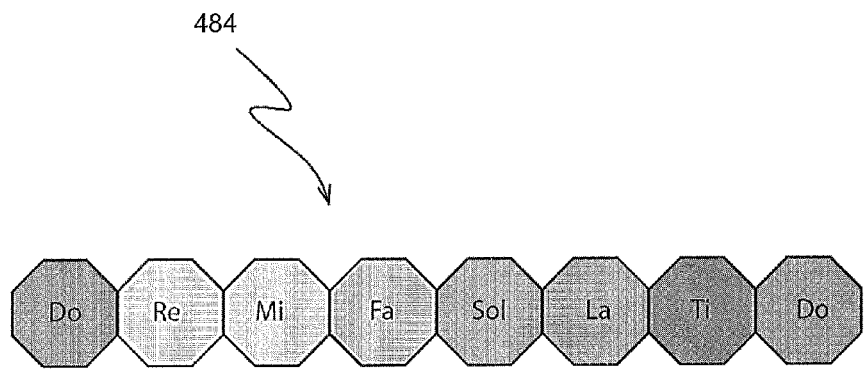
FIG. 31 illustrates one embodiment of a scale association of the melody palette according to yet another embodiment of the invention.

FIGS. 29-31 illustrate embodiments of scale associations of the melody palette according to one embodiment of the invention.

FIG. 29 illustrates one embodiment of a scale association 470 with octagons 741 mapped to scales 472, 473 by scale degree numbers 474, 475. Mapping of scaling member numbers instead of pitches can provide for a plurality of scale structures and tonics to change at any time while a user creates a melody. When the tonic 476, 477 and/or scale pattern 478 changes, the pitches 479 associated with the octagons can preferably change accordingly. In this way, a user can preferably be "locked" into the currently playing scale system and key center.

FIG. 30 illustrates one embodiment of a scale association 480 with shifted versions of adjacent rows of octagons whereby more than one octagon may represent the same pitch 481, 482, 483. This redundancy provides otherwise difficult flexibility. The amount of the shift is dynamically configured and has different consequences depending on the amount of shift. Embodiments of the invention can include but are not limited to virtually any row and/or column relationship. Specifically, as shown in FIG. 30, three different row shift relationships are shown. A two-degree scale member shift 481 exists in which the octagon directly above another octagon skips a scale degree to play a musical third. With a two-degree scale member shift a user may access any pitch class member of a heptatonic scale from any adjacent octagon except at grid boundaries. Shift 482 illustrates octagons shifted by three. A user may access any pitch class member of a heptatonic scale preferably from any adjacent octagon except at grid boundaries. Embodiments can utilize direct vertical movement skips by fourth (up and down 3 scale steps). Skips by third are still possible via diagonal movement, but it can be more difficult to move certain input devices diagonally than to move them on axis, especially because there can also be an inherent gap (diamond areas) between octagons along the diagonals of melody palette 450 (FIG. 27). Shift 483 illustrates octagons shifted by four. A user may access any pitch class member of a heptatonic scale from any adjacent octagon except at grid boundaries. Wider skips can be easily accessed, but movement by smaller intervals is more limited than in shift 481 and/or shift 482.

It is contemplated that the melody palette 450 can comprise functional associations with a scale and can preferably be displayed in a variety of ways, including but not limited to a user seeing the relationship between scale degrees and the arrangement association of octagons. FIG. 31 illustrates a portion of a melody palette with a scale association of color-coded scale degrees according to one embodiment of the invention. Each octagon is color-coded to music scale members, specifically to show the scale member solfege 484. For example, red may be associated with the first scale degree with each successive adjacent scale degree mapped to a color that moves along the hue color wheel values, beginning with red, and moving around the color wheel until the next octave is reached. Although the scale degrees are color-coded, it is contemplated that music scale members may be distinguished by some other visual method such as highlighted active or inactive octagons of the grid or dynamically labeling each octagon according to function or user feedback.

Figure 32:
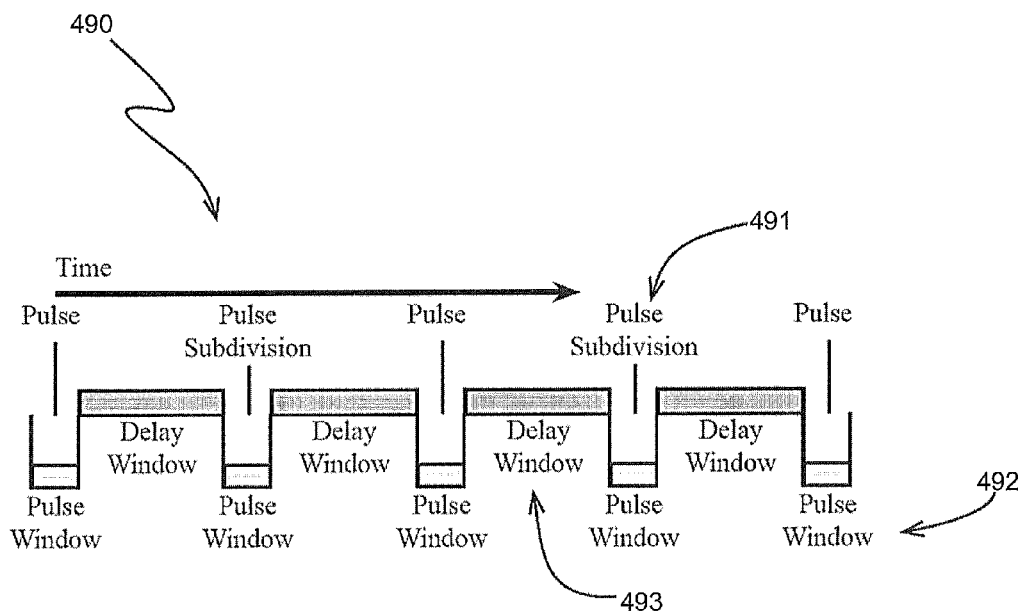
FIG. 32 illustrates a locking mechanism method according to one embodiment of the invention.

FIG. 32 illustrates a locking mechanism method according to one embodiment of the invention. The locking mechanism method 490 is in the time domain (rhythm) and allows a user to lock activity to predefined musical scales and/or rhythm associated with an accompaniment. By default, the melody pitch content is locked to the accompaniment, which is a function of how the octagon grid works as discussed above. The locking mechanism 490 facilitates rhythmic accuracy by locking the user melodic rhythm to the accompaniment rhythm. In one embodiment, the locking mechanism 490 results in a melody conforming to rhythmic subdivisions of accompaniment pulses, locked into one or more accompaniments. The locking mechanism method 490 comprises: a pulse and pulse length 491; two calculated sets of time domain windows: pulse windows 492 near the pulse and pulse subdivision, during which user note activity events are processed without change; and delay windows 493 between pulses and pulse subdivisions whereby user events are optionally not processed until the next pulse window. Pulse window 492 length can be varied, and ranges from between approximately 0 ms before and/or after the pulse subdivision, to the pulse width before and/or after the pulse subdivision. The present embodiment uses a window approximately 20 ms before and 20 ms after the pulse subdivision although any window is contemplated.

Figure 33:
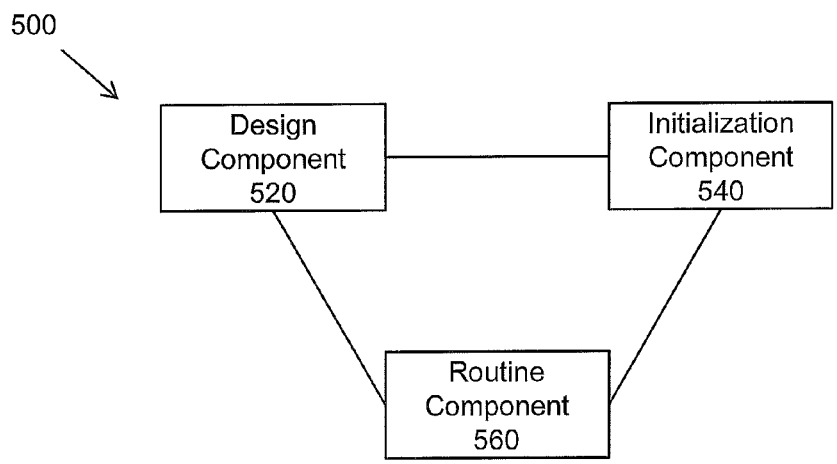
FIG. 33 illustrates an embodiment of a simulation program according to one embodiment of the invention.

The invention provides a framework for applications that may be used to simulate video content including real-time simulation of video content. FIG. 33 illustrates the components of a simulation program 500 (FIG. 1) according to one embodiment of the invention. The simulation program 500 includes a design component 520, an initialization component 530 and a runtime component 560.

The design component 520 comprises various features including design of curves, nodes, path descriptions, solutes/particles, and emitters. The initialization component 530 comprises initialization of path nodes, emitter data structures, and generation of solute objects. The runtime component 560 comprises external triggers, emitters, particles, and particle track along node path.

Design of particle flow using the design component 520 involves defining curves by generating node lists that represent them, and defining path descriptions described as a list of nodes. It preferably involves creating solute (particle models) and setting up and defining emitters and the solutes they emit. The initialization component 530 involves the calculation and creation of emitter data structures and/or data, and can preferably generate path node lists and solute data structures needed for the solute animations and/or path movement. The runtime component 560 enables animation and/or path movement including receipt of triggers from the music texture program 300 (FIG. 1) that trigger particle emitters. Triggered emitters preferably activate solutes (particles) that track one or more paths defined by one or more path node lists.

Figure 34:
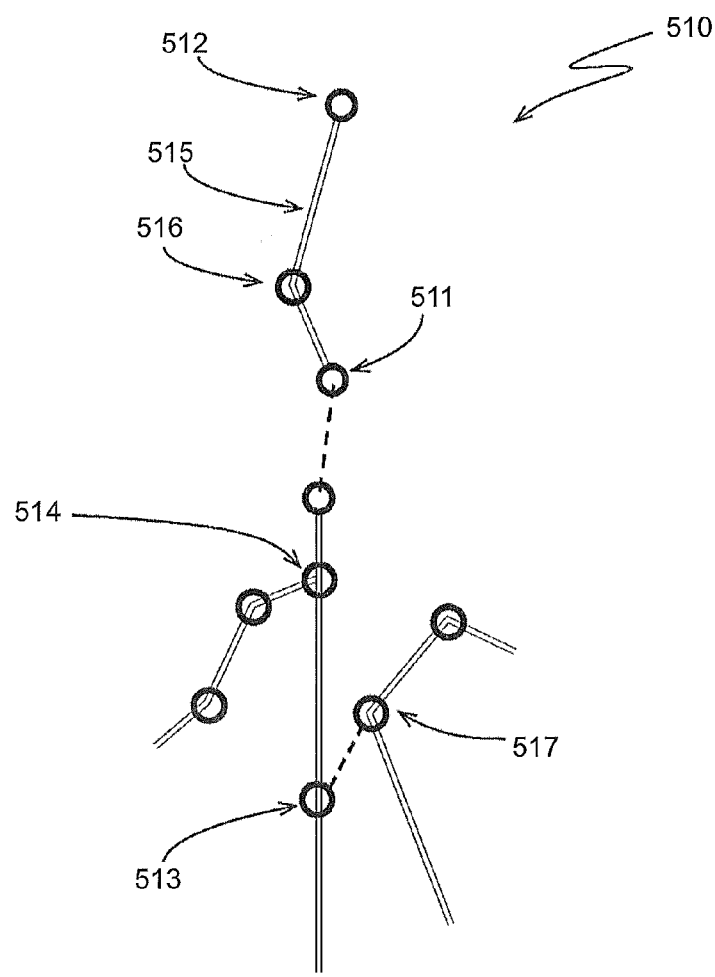
FIG. 34 illustrates node tracking method according to one embodiment of the invention.

As an example, FIG. 34 illustrates node tracking according to one embodiment of the invention. Node tracking 510 includes branch and merge nodes comprising segment start/end points 511, 512, merge points 513, and branches 514. Particles emitted by emitters follow a node along a path segment 515 starting at start node 512 or any node along the segment (e.g. 516). Segments can preferably branch 514 and a particle can follow one of the branches. In other parts of the node tracking method 510, particles can merge into a segment at any node in the path segment (e.g. 513) from any node in another segment 517.

In one embodiment, the simulation program 500 (FIG. 1) can animate the absorption and secretion process of a kidney nephron including solute flow patterns and interactions at various stages of the nephron. As an example, the simulation program 500 can simulate the sodium-potassium exchange through a membrane of a cell including simulation of peritubular capillary path segments, hidden nephron path segments, and exposed nephron path segments. It is contemplated that hidden areas along the paths can provide a convenient area for the simulation program to readjust solute concentrations.

FIG. 35 illustrates a graphical user interface for controlling video content of the simulation program according to one embodiment of the invention. The GUI 550 plays back video content through features including, for example, play/pause control 551, movie position 552, mute control 553, main volume control 554, and main screen return 555, which enables a user to return to the main screen or a previous screen.

For exemplary purposes only, three examples of the invention will be discussed below:

Example 1: Music Program

The music program provides users a simple means to play melodies that conform to algorithmically created, static but ever-changing musical accompaniments. In this example, the music texture program is the music-generating software that created the music accompaniments (textures) and provided data to the melody-governing software. The melody palette is the interface for creating melodies.

A library of accompaniments is loaded from a file to computer memory and a subset of the textures is loaded into twelve baton components, ensemble components, and channel cycler components. The textures defined parameters for two sound modules: one that played the texture (referred as accompaniments in this context), the other to play melodies.

A controller in the main window opened an interface to permit the user to adjust program options and settings including mouse click/hover selection and sensitivity (FIG. 36).

When locked, the melody follows the current accompaniment rhythm. The values represent the number of notes that are distributed on or between baton pulses. The effect of these values varies according to each accompaniment. A value of one locked the melody to the pulse; two locked to the pulse and half way between pulses, etc. Smaller numbers are more appropriate for accompaniments with faster pulses, larger numbers for slower.

In this example, the pulse window length had a fixed length of 20 ms spanning from 10 ms before, to 10 ms after each pulse and pulse subdivision. Time not described as an event pulse window is denoted a delay window. Both sets of combined windows are contiguous and non-overlapping. However, the windows may overlap if, for example, different rules apply for note-off behavior and note-on behavior.

During the time period in which user events are held, the most recent note-on and the most recent note-off states are stored in memory and used to facilitate what occurred at the end of the hold. At that time, the information is analyzed and the following actions may occur: (1) any note that was on and was no longer selected by a user is turned off, (2) any note that is on and still selected is left alone (even if a user deselected and reselected the note during the hold time period), and (3) any currently selected note that is not on is turned on.

This immediately made virtually any activity from a novice user musically sensible. It also allows people with movement disabilities to play in sync with the accompaniment even if their actual movement capability normally does not allow such a performance. Each accompaniment had its own set of available instruments. Users choose one among them to play their melody, such as by hovering the mouse over one of the instruments in the tab list.

Each accompaniment establishes its own tempo (speed). A user adjusts this speed faster or slower to suit them using the tempo adjustment control. It should be noted that it is possible for a user to make a precise adjustment elsewhere in the interface. Several visual elements orient a user to time domain activity. A dot in the center of the grid either flashes on the beat or the pulse. The melodic rhythm is locked to a subdivision of this timekeeper. The outer flashing dots show the beginning of each measure as defined by the currently playing or most recent (if the accompaniment is turned off) accompaniment baton.

The music program automatically played through the current set of active accompaniments. A user turns this feature on and off. Musical accompaniments have a rhythmic cycle as seen by a slider just above the melody palette. A user sets the number of times the accompaniment played through the cycle before changing to a new accompaniment. A user chooses for the automatic selection to be either sequential or random. Random mode played accompaniments in random order. None are played again until eleven had been played, at which time a new random order is established.

A list of accompaniments is available from which a user selects. The following explains the user interaction with the list of accompaniment tabs: hover the mouse over one of the musical accompaniments to select and turn it on, hover over the currently selected accompaniment to turn it off, or hover over a different accompaniment than the one currently playing to switch to a new one.

The scale representation shows notes used in the accompaniment and the melody palette. The scale is determined by a variety of factors, primarily the design of the accompaniment currently playing. The octave is subdivided by twelve equal semitones (horizontal lines) and the relative distances (intervals) are subdivided between members of the scale. The first note of the scale is the tonic which may be any pitch that can periodically change. The rest of the notes of the scale are then built from this note according to the interval description of the scale, which may be numerically displayed at the top.

When a tuning is applied to the scale, it graphically and numerically displays the pitch deviation from these equal-distance semitones. The values provided are in either cents (100 cents=1 semitone) or shruti (6 shruti=1 semitone). The ascending and descending line hanging from notes that do not fall exactly on the equal-tempered pitches show their relative deviation. However, these lines are exaggerated by a factor of 1.75, visually amplifying the tuning differences.

When playing a melody, the played note is highlighted on the graph. In addition, it is shifted according to the scale tuning. Furthermore, a user is allowed to manually change the tonic. In context, only one tonic controller shows at a time. Two buttons allow a user to cycle through the variations to choose their preference. There are four options for controlling the tonic. The two music keyboard controllers allow direct selection of a particular tonic by selecting the white or black key. Other than layout, they are identical to each other. The layout difference reflects the hover accommodation. In one controller, there is space between the upper black keys and the lower white ones. This provides an area in which the pointer rested and moved to any black or white key without selecting another. In another, one either had to move across unwanted keys, or go around the controller to get from one side to the other. Two other controllers changed tonic relative to the current tonic. These changed up or down by the number of semitones (half-steps) displayed on each button.

A user may change the scale and tuning system at any time. The tuning and the scale follow the current key (tonic, key-center, tonal-center). However, these changes are not remembered when a user selects another accompaniment (background music texture). A user may choose not to display solfege, display only in selected octagon, or display solfege in each octagon.

In this example, two sound modules are used: one plays the accompaniments and the other plays the melody. Audio controls set the volume level for each sound module. The signal indicator helped to monitor the note activity levels. The signals optimally do not reach a maximum. An occasional peak (max) is not usually problematic. However, reaching the maximum indicates that the signal is potentially distorted. This is especially important when recording. In addition, there is a reverberation level control that gives the sound reverberation in order to give the music some warmth and depth.

Example 2: Tuning System

The hierarchy for scales and tunings start with the scale, which is a subset of the general 12-tone chromatic semitone collection. Tunings, regardless of how they are calculated and derived, are translated into this system, with actual pitches specified as microtonal deviations from the twelve-tone equal tempered system. This is necessary for most sound modules because most required a pitch value to indicate a note, not simply a frequency. Certain types of sound synthesis are frequency-based, so the described tuning system supports both systems. The tuning system had three primary functions: (1) the input of pitch class and register value with a microtonal offset results in the output of the frequency, in Hz, of the input note, (2) the input of a frequency results in the output of a scale pitch class with register, and its microtonal deviation from its closest equal-tempered note, i.e. the inverse of (1), (3) the tuning deviations of each 12-tone pitch class is output as a list of values, one for each pitch class in the 12-tone equal tempered system. In this example, the tuning system was defined with the parameters as shown in FIG. 37.

In this example, it is assumed that the tuning system conforms to certain Western tuning and pitch conventions. Specifically, a twelve-tone per standard octave chromatic semitone scale with pitch class index values 0-11 for which 'C'=0. This does not imply that the described system is confined to this system. In fact, it was designed to conform to a much greater variance of conventions.

Scale frequencies are established with the following procedure: (1) basic scale dimensions and input/output microtonal values are set up, (2) a basis for the reference frequency and register is established, (3) the microtonal interval array of successive scale members with array size "scale size" given a tuning definition type and list is calculated, (4) a second scale or procedure is established that defines the frequencies representing the pitch classes as tonics (tonic frequency array), (5) given a specific tonic pitch class, used the tonic frequency array to establish the frequency of the tonic, (6) calculate the pitch class frequency array of the remaining scale members using the tonic as a reference and the microtonal interval array as the basis for calculating each successive pitch class frequency array, and (7) given a specific pitch class and register, calculate its frequency by multiplying the indexed pitch class frequency from the pitch class frequency array times the octave ratio, raised to the difference between the reference and requested registers. The parameters shown in FIG. 38 established fundamental variables that affected calculation outcomes. Reference parameters established the basis for the tuning frequencies. A reference frequency is linked to a pitch class index and reference register. FIG. 39 shows a tuning example of equal-tempered deviation.

The reference register is used with the incoming register value, octave ratio, and scale member frequencies to calculate the final output frequencies. FIG. 40 shows two parameters that determine the method used for input tuning data. The starting point is the reference frequency and its pitch class index. The scale definition parameters as shown in FIG. 41 are used.

There are five input methods to determine how intervals are calculated between scale members to establish the microtonal interval array as listed in FIG. 40. Examples of the first four are shown in FIG. 42. Three of them are variants that used microtonal intervals and a fourth is a list of frequencies. A fifth is a list of pair-wise values representing frequency ratios (see FIG. 44).

In one embodiment, the input and output octave division is 1200, which means microtonal values are given in cents. Scale size is 12 for a standard 12-tone system. The octave ratio is 2:1, which is standard. Pitch class 9 is 'A', which is set to 440.0 Hz.

FIG. 42 shows two tuning systems and four alternate input lists that derived them, one column for each of the first four methods mentioned above. The two scales are shown in the major columns "equal-tempered" and "variable". The input values in the columns "interval list", "scale list", "equal-tempered deviation" (E.T. Dev.) and "freq. list" are used to calculate the frequency list. Applying one of these is also used to calculate the values in the other columns.

For the interval list method, a list of values that represent successive intervals in the input microtone division scale are used to fill the vector of intervals in successive ascending order. The first integer in the list is the scale member index offset from the tonic. If the input octave division is specified in cents with 100 cents representing an equal-tempered semitone, the list is comprised of 100's as shown in the "interval list", "equal-tempered" column in FIG. 42. An example of a variable interval tuning is shown in the "variable" side of FIG. 42 (using cents). With an octave division of 72 (shruti), the same tuning is comprised of values as seen in FIG. 43.

As can be seen in this example, "scale list" is similar to "interval list" except each pitch class is given as a microtonal distance from the tonic rather than from the preceding scale member. Equal-tempered deviation specified the microtonal deviation of each scale member from the closest equal-tempered correspondence. The "freq. list" specifies the relationships by listing the frequencies of pitch classes within an octave. These establish the relationships between intervals. Other factors optionally change the actual frequencies used for output.

Ratios define frequencies with an array of list pairs giving the frequency ratio (using numerator:denominator) of each scale member from the tonic. The Pythagorean tuning system is entered with the values shown in the "ratios" column in FIG. 44.

The first pitch class of a scale is the tonic. Any pitch class is optionally designated as the current scale tonic. The remaining scale members are calculated from the frequency of the selected tonic using one of the methods discussed in the previous section to calculate the microtonal interval array.

There are four methods used to calculate the tonic frequency. The first method as shown in FIG. 46, an equal tempered scale is calculated according to the reference frequency and reference pitch class index. The additional parameters used to calculate the tonic frequency are shown in FIG. 45. An equal-tempered deviation array is used that consists of: [0, 0, −50, −50, 50, −25, 25, −25, 0, 0, 0, 50]. In addition, reference index pitch class 9, reference register 4, and reference frequency 440 Hz are used. The tonic is assigned to its equal-tempered tuning with the other pitch classes tuned relative to the tonic. Pitch class 9 (column A) is the system reference index with reference frequency 440 Hz (column B, index 9). A twelve-tone equal-tempered scale calculated from the reference frequency generates the tonic frequency list (column B). The E.T. Dev. Array in column D that is calculated by one of the methods discussed above represents the scale tuning as microtonal differences from the equal-tempered pitch class frequency. The tonic is pitch class 2, so the E.T. Dev. Array was shift rotated to start on PC 2 (columns F and G). The E.T. Dev. value at PC[2] is zero (had it been any other value, an additional step would be needed to adjust the array so that PC[2] is zero). This step will be shown in later examples of other tonic frequency calculation methods. The frequency of the ET tonic in column B is used as the basis for establishing a frequency scale in column H using the E. T. Dev. array (column G) to shift the equal-tempered frequencies in B. Because the new basis for calculating scale frequencies starts at PC[2], and the E.T. Dev. value of PC[9] is −25, the frequency of PC[9], which is the original reference frequency pitch class, is shifted down by 25 cents (compare columns B and H at PC[9]).

The second method as shown in FIG. 47 held one of the pitch classes at a constant frequency and adjusted the remaining pitch classes (including the tonic) in such a way that the held pitch class did not change. In this method, there is an additional parameter specifying which pitch class is held constant. For this example, PC[9] is the reference frequency of 440 Hz. The tonic is PC[3] and the held pitch class is PC[7]. A twelve-tone equal-tempered scale calculated from the reference frequency generated the tonic frequency list (column B). The fixed note is at PC[7], so its frequency became the basis for subsequent calculations. The E.T. Dev. Array in column D denotes the scale tuning. It is shift rotated for the tonic PC[3] (columns F and G). To hold the frequency for PC[7] constant, its deviation from equal-tempered tuning had to be zero. Therefore, 50 is subtracted from each member of the E.T. Dev. Array (column H). This list is applied to the E.T. Freq. list (column B) to calculate the pitch class frequencies (column I).

The third method of determining the tonic frequency is to follow a base microtonal scale (FIG. 48). A basic scale is constructed using one of the tuning definitions and tuned according to the reference frequency, which is held as in method one, but with a tonic pitch class specified as an additional parameter. This scale is then used to map the tonic for the active scale tuning as the tonic changes. This is similar to following the ET scale. The main difference is how the tonic reference scale is calculated. Instead of creating an equal-tempered scale, it created a scale with tonic 0 based on the tuning interval array. For this example, PC[9] is the reference frequency of 440 Hz and the tonic is PC[2]. A twelve-tone equal-tempered scale calculated from the reference frequency generated the E.T. frequency list (column B). The E.T. Dev Array defining the microtonal intervals of the scale (column D) is applied to the E.T. Freq. Array (column B) to generate a Base Scale that is used to establish the tonic frequency list (column E). The E.T. Dev Array is applied to PC[2] in column G and is shift rotated in column H. For the tonic to remain at the retuned Base Scale value, its microtonal E.T. Dev. needs to be the same as that which established it. The value in column H for PC[2], however is zero, so the E.T. Dev. values are adjusted so that it is −50. Therefore, 50 is subtracted from the members of the E.T. Dev. array (column H) to obtain the values in column I. These were then used to calculate the PC Freq. List in column J from the E.T. Freq. list in column B.

In the fourth method of determining the tonic frequencies as shown in FIG. 49, the tonic is derived directly by a user-defined frequency list, one for each pitch class. The tonic is assigned the corresponding frequency and the other pitch classes are calculated accordingly. This is the same as the preceding option except that the reference frequency (e.g. A=440) is used as a reference for the final calculations with the E.T. Dev. list. For this example, PC[9] is the reference frequency of 440 Hz and the tonic is PC[7]. A Tonic Frequency Scale filled in specific frequency values for the tonics (column B). An E.T. Dev. array (column D) is shift rotated to assign to the tonic PC[7] (columns F and G). An E.T. reference scale is calculated using the reference register, pitch class index, and frequency (column H). The PC Freq. list is calculated using the microtonal E.T. Deviations and the E.T. reference scale to derive the PC Freq. List (column J). The actual E.T. Deviations are seen in column I.

Once the frequencies of the reference register are calculated, several types of output are possible, including: (1) a list of E.T. Dev. values appropriate for "tuning" a sound module, (2) the current tonic frequency, (3) a PC index, register, and microtonal offset given a user-input frequency, (4) a frequency, given a user-input pitch class index, register, and microtonal offset, (5) a frequency, given a note number representing the pitch class index and register, along with a microtonal offset. The first two are output when any of the parameters changed that affected them. The remaining types are output when their respective input values are provided (FIG. 50). The generalized formula for calculating a frequency value given a pitch class, register, and microtonal offset used the variables in FIG. 51. Specifically, FIG. 51 is a table illustrating the variables for the formula:

$$f=(F+m)*O(r-R).$$

for calculating frequency according to one embodiment of the invention.

Example 3: Simulation Program

The simulation program simulates the absorption and secretion process of the kidney nephron. Although the simulation is not designed to be physiologically realistic, it is symbolic and structural. The reified representation uses mnemonic and simplified structural depictions to demonstrate complex processes. The simulation reveals multiple levels of detail in its overview, while including a deeper level of detail in accompanied animations. Graphic representations of molecular activity are metaphorical. Many traditional simulations showing such activity use various standard depictions, including the well-known ball and stick structures to show their chemical component and bond structure. While this has many benefits, such representations may not always be the most effective means of demonstrating complex systems.

The simulation program uses mnemonic representations that are easy to remember. For example, bananas represent potassium (see FIG. 52). The association makes it easier to visually understand the simulated process because the form of a bunch of bananas is strikingly different than representations of other solutes, such as ice-cream cones that depict glucose. Potassium has an association with the color green; hence, the bananas are shown as under-ripe. In the animated clip a plus sign rides on top, representing the positive ion charge of potassium.

There are two primary applications that run concurrently: the game application that presents visual information, and the music and sound application that provide audible data. The following initialization steps are taken: (1) if not valid, illustrate a registration screen, (2) otherwise, it loads sound-related resources including sound playback files for movies and the music program for real-time music generation, (3) after this is done, it launches the visual application (i.e., modeling and animation application), (4) when visual application had loaded its resources and the main custom data file, it sends a message to the coordinating program to indicate that it is ready for user interaction, (5) coordinating program then returns a message indicating that it is ready, (6) the visual application then allowed functionality of the visual interface of the simulation program, which may change the appearance and functionality to indicate that a user may proceed to the simulation and to view the movies, (7) a selection is made from a variety of menu options, for example, about, help, movies, simulation, and quit.

When a user initiates the simulation, the application loads and calculates the resources it needs to run the simulation. A user navigates through the simulation either by initiating a preset location or by manipulating navigation controls (e.g., computer keyboard). Movement forward, backward, left, and right is always along a horizontal plane regardless of the camera (viewer) tilt angle. Movement is also possible along the vertical axis (up and down). Music for the simulation is algorithmically generated in real-time. After initialization, the simulation program sends a status message to the coordinating program. The coordinating program then requests a user location from the application. A user may see a simulation of a kidney nephron and faced the glomerulus. The application then calculates a user's view to determine which section of the simulation is the most prevalent in their view.

In accordance with this, the coordinating program chooses an appropriate music texture associated with the segment of the simulation program a user is viewing. The music texture program is instructed to begin generating music and the baton component starts its pulse. Each major segment of the simulation program has its own music associated with it. As the viewer peruses the virtual simulation their gaze is monitored and a music texture is chosen accordingly by having a game application use a ray trace algorithm to determine what area of the simulation is in the center of the viewing screen. Because calculations for this are computer intensive, each area of the simulation contains a low-polygon object that covered each one.

The baton component sends trigger pulses to its ensemble component and also to the game application, which uses the trigger information to activate solute emitters that are then set in motion to track nodes in their path list. The triggers also activate periodic animations, primarily the sodium-potassium pumps (ATP). By using the coordinating program to cue visual activity, the simulation is synchronized to the music. At regular intervals, the music generator sends the simulation an index value representing a cyclic coordination value. This triggers the emitter procedural code script with the index value.

The game application provides basic components that are used to animate the environment in real-time. The user is able to extend the basic capabilities using custom procedural script code that accesses the game application functions with procedural code scripts.

The particle flow is the main focus in the simulation. Particles follow paths that are activated and deactivated and interacted with other particles and animated objects. Particles move along curve paths by tracking a sequence of nodes along the curve. Particles become active when emitters activate them. Curves, nodes, emitters, and particles are object entities in the game application, i.e., they are graphic model objects. However, each has attributes with different functions within the simulation as shown in FIG. 53. To further facilitate the simulation, several data structures are used to coordinate elements and manage the simulation as shown in FIG. 54.

Path design and implementation is a three-part process as illustrated by FIG. 55: design phase, initialization, and runtime. Several procedural code scripts are used at various stages of development and runtime that manage aspects of the particle paths. These interact with the logic of the game application through the procedural code application programming interface (API). Some of the data is defined and created in the scripts, so the development becomes part of the script code. The paths are graphically modeled as 3D curves. A procedural code script is run after this phase to generate path nodes. Two other procedural code scripts are run at initialization to create data structures mentioned above (see FIG. 55).

While emitters began the particle path, once the particle enters the system its movement is governed by the game application in coordination with the defined path node lists. For this reason, path descriptions are carefully designed to allow the designer to coordinate activity, primarily by regulating the solute speed along its path. Particles (solutes) are created at startup to eliminate the need to dynamically allocate memory. If a particle is not in use, its xyz location is placed outside the simulation system and its visible flag is set to invisible. In addition, to reduce the need for runtime calculations, many variables that remain stable during the simulation are pre-calculated. This increases overall memory requirements, but also reduces compute time.

Path nodes are created using curve objects, and the naming convention is important. The node generator uses the name of the curve as the basis for naming nodes. Game application tracking does not follow curve paths, so node points have to be derived from curve data to create "empties," which are game application objects that define a point in space and represent a memory data structure of existence, but do not have any shape or form. Node empties are automatically calculated and generated in the development phase. If curves are modified, the nodes are regenerated using a custom procedural code script generated function (gen_nodes.py). Node names used the original curve name with an appended serial number. Curve and therefore node names are always unique. Each set of nodes defined by a curve represents a path segment. Examples of curve and calculated node names are shown in FIG. 56.

At runtime, path node lists are generated for each solute type. These represent paths and path segments each solute potentially follow. The node lists are generated according to path definitions: a list of path segment descriptors that define how the solute behave and travel. These paths are not complete flow lists, i.e., the node list (path) generator does not follow the complete path a solute may follow; it only generated path segments. The branch record for a segment end pointed to a node in another segment to allow alternate pathways based on probabilities and recirculation. Aside from simple paths, solute paths need to have branches and be able to recirculate in such a way that each time a solute travels a path segment, it had to have a specific path behavior.

The path node list procedural code script creates the node lists only up to a segment end point. In this way, recirculation occurs without a stack overflow because the entire path of any solute is not generated from beginning to end, but only segment by segment with branch, merge, or stop instructions for each node. Each segment descriptor (regardless of how many nodes it described) begins with a directive. The possible directives are: start, continue, merge, branch, replace, and trigger. Each of these had some similar attributes, but also some unique ones. The code that generates the path node lists interprets the descriptor according to the directive. Starting a node list segment contains a curve reference, a node start point, and an indication of the last node in its sequence. The start point is a node base name, referencing the derived curve segment, and an index determining which node in the segment to start with. The end node is part of the same curve and is denoted as either 'end' or as a specific index value.

The next field indicates whether the path ends or continues from the last generated path node in this descriptor: 'cont' for continue, and 'stop' to end it. In the generated node list, this is placed in the number of branches field. If stop, the branch number is −1, otherwise it is 0 (no branch, but continue to the next node listed), or greater than 0, meaning a branch occurred at this node. If the particle is to stop at this node or continue to the next listed node there are no branches in the branch field.

The next field is a list of values representing the speed of each path segment between nodes. Each generated node had a speed specification. The last listed speed is applied to its corresponding segment and any path node segments remaining to be generated. For this reason, if an entire descriptor path list travels at a constant rate throughout, it only needs to have one speed in the list. This method of using the last element in a list to apply to any remaining elements in a sequence is ubiquitous to many code elements. Emitters have a similar feature. A descriptor can add a branch to an existing node based on a probability factor. Likewise, branches are chosen using a probability factor. Because the branch is used to merge a path segment into a predefined segment, a single branch with 100% probability simply indicated that the particle continued along another path. Another use for the branch includes the case in which some particles are destroyed and others continue, reducing the concentration level at a certain point. In this case, two branches are used: one indicating from where to continue, and the other a self-reference with the "stop" field set to True.

['branch', [node name path point, instance in node list] from,
[node name path point, instance in node list] to,
probability of branch,
<'cont', 'stop'>] // Boolean: stop=true, continue=false
Example:
mks.append(['branch', ['neph_50.003', 1], ['cd_rec_n3.000', 1], 'cont', 50])
Generates by Modification of Node Index 180:
nodes.append([180, [476764112, 'neph_50.003', 0.6, 1.0, 2, 0, [
  [181, [476764328, 'neph_50.004'], 50, False],
  [228, [476763992, 'cd_rec_n3.000'], 50, False]], [ ]])
nodes.append([181, [476764328, 'neph_50.004'], 0.6; 1.0, 0, 0, [ ], [ ]])

The replace directive is the same as branch but replaced the 1st node indicator with the 2nd, rather than adding a branch. Some common segments, like the capillary, have their own generating list that most particles use. In some cases, a particle may use the predefined list but need to slightly revise the path. These path segments are generated independently for each particle type. The replace directive allows the path node generator to alter elements of the predefined list to suit a particular particle path.

['replace', [node name path point, instance in node list] original,
replace with [branch name path point, instance branch in branch list],
<'cont', 'stop'>, probability]
Example:
std_glom(mks)
mks.append(['replace', ['glom_n0.005', 1], ['glom_n0.006', 1], 'cont', 40])
Without Replace:
nodes.append([44, [859551264, 'glom_n0.005'], 0.5, 1.0, 3, 0, [
  [51, [859553448, 'glom_n3.000'], 40, False],
  [59, [859552896, 'glom_n4.000'], 30, False],
  [68, [859550280, 'glom_n0.006'], 30, False] ], [ ] ])
After Replace:
nodes.append([44, [920185888, 'glom_n0.005'], 0.5, 1.0, 3, 0, [
  [45, [920185648, 'glom_n0.006'], 40, False],
  [59, [920184712, 'glom_n4.000'], 30, False],
  [68, [920185648, 'glom_n0.006'], 30, False]], [ ]])
The first branch (index 51)—replaced with node index 45.

The 'trig' directive (trigger) does not contribute to the definition of a path. Instead, it defines an action that occurs when the solute reaches a particular node. The only triggers are those that related to H2CO3 transformation.

['trig', [node name path point, instance in node list],
threshold, [list of message tasks to perform]
Example:
mks=[['start', 'nds.ept_h+_n0', [0], 5, 'stop', [0.133], [1.0]]]
mks.append(['trig', ['ept_h+_n0.005', 1], 0.001, [['t', 'w_bc', 'emit.gen.00']]]);
Generates:
nodes.append([0, [863161040, 'ept_h+_n0.000'], 0.133, 1.0, 0, 0, [ ], [ ]])
nodes.append([1, [863161112, 'ept_h+_n0.001'], 0.133, 1.0, 0, 0, [ ], [ ]])
nodes.append([2, [863161400, 'ept_h+_n0.002'], 0.133, 1.0, 0, 0, [ ], [ ]])
nodes.append([3, [863158688, 'ept_h+_n0.003'], 0.133, 1.0, 0, 0, [ ], [ ]])
nodes.append([4, [863159600, 'ept_h+_n0.004'], 0.133, 1.0, 0, 0, [ ], [ ]])
nodes.append([5, [863160296, 'ept_h+_n0.005'], 0.133, 1.0, −1, 1, [ ],
[[0.001, [['t', 'w_bc', 'emit.gen.00']]]]])
which triggers this emitter:
mk.append(['emit.gen.00', 't', [4, 0], [3],
['w_bc', 'hco3', 'h+'],
['ept_h+_n0.005', 'ept_hco_n0.007', 'ept_h+_n0.008']])

The original particle design intention is to create a system by which solutes realistically travel their full and correct path from glomerulus to exit. However, solutes actually travel only partially through the system. At certain key points, a special representation of the nephron segment hides solutes as they travel along the nephron. At these hidden points, solutes entering the area are deactivated while a new set of solutes are activated. This is done for two reasons. First, certain solutes need to be timed to arrive at a specific point at a specific cyclic time. Timing is easier to coordinate along shorter paths than longer paths, especially if the longer path has branches that may have eliminated a solute that is needed to demonstrate a specific process. Second, the proportional concentration of solutes along the nephron is not as informative if they are correctly represented. This is because the concentration of solutes entering the system is reduced by 70% by the end of the first major segment. Because the complexity of the loop of Henle requires a high concentration of active solutes to demonstrate the complexity of the function, a reduction of 70% reduces the visual activity too much, or conversely, increases the activity of the previous segment too much to maintain educational impact. Therefore, each nephron segment is treated as an independent system that only appears as if the solute paths are continuous (if one did not examine the hidden points too closely).

Each node data record contains an id index, node name, a path speed factor, particle size scale, number of branches, and a list of branch nodes.

Node record: [ndx, [memory pointer to this data record, node_name], speed, scale, number of branches, reserved, [branch list], [reserved list]]

Example of a path node list segment. This example shows nodes 147-154 in the path node list for one solute type. ("nodes.append( )" is the procedural code function that attaches the data structure to the list as it is being created.)

nodes.append([147, [920234224, 'neph_40.000'], 0.6, 1.0, 0, 0, [ ], [ ]])
nodes.append([148, [920234200, 'neph_40.001'], 0.6, 1.0, 0, 0, [ ], [ ]])
nodes.append([149, [920235256, 'neph_40.002'], 0.6, 1.0, 0, 0, [ ], [ ]])
nodes.append([150, [920235280, 'neph_40.003'], 0.6, 1.0, 0, 0, [ ], [ ]])
nodes.append([151, [920234272, 'neph_40.004'], 0.6, 1.0, 0, 0, [ ], [ ]])
nodes.append([152, [920235616, 'neph_40.005'], 0.6, 1.0, 0, 0, [ ], [ ]])
nodes.append([153, [920234920, 'neph_40.006'], 0.6, 1.0, 0, 0, [ ], [ ]])
nodes.append([154, [920235592, 'neph_40.007'], 0.6, 1.0, 0, 0, [ ], [ ]])

FIG. 57 shows node record fields for the following example:
nodes.append([180, [856337080, 'neph_50.003'], 0.6, 1.0, 2, 0, [
 [181, [856338280, 'neph_50.004'], 50, False],
 [287, [860056632, 'cd_rec_n3.000'], 50, False]], [ ]])

Nodes require branching to other nodes in the overall list. In that case, the node record contains a list of branches. The branch list contains one or more nodes that continue the path unless it represents an end node. The fields of the branch record are shown in the table below. At initialization, record memory pointers are provided to optimize calculation speed.

Branch fields: index to branch to, [pointer to memory, node name, probability, delete (T/F)

FIG. 58 shows branch fields for the following example:
[287, [860056632, 'cd_rec_n3.000'], 50, False].

Solutes are emitted into the system at specific locations and points in time. This is accomplished by using a procedural code script that is triggered at intervals determined by the music program. The script runs through a list of potential emitter descriptions, triggering those that conform to particular criteria each time the script ran. For example, there is a global counter that cycles through index values 0-3 one increment each time the script is triggered. Certain emitters start solutes on certain index values; others ignore this value to help coordinate and regulate concentration flows.

There are three types of emitters: sequential, burst, and trigger. Each emitter is defined with a list of solutes and their emission node (start point). Sequential emitters cycled through the list, starting only one solute each time the emitter is triggered. In burst mode, the listed solutes are emitted each time the emitter is triggered. Trigger mode activates another process. Initialization: create emitter data structure (FIG. 59). Example of a burst type emitter:

mk.append('emit.alh.00', 'b', [2, 1], [9, 6, 3, 3, 5, 3],
 ['na_c1', 'na_3',
 'c1_3', 'c1_3', 'na_3', 'pot_2', 'pot_3'],
 ['neph_12.000', 'neph_11.001',
 'alh_c1_n0.004', 'alh_c1_n0.004', 'alh_na_n0.004',
 'alh_pot_n1.000', 'alh_pot_n0.004']])

to generate the structure shown in FIG. 59.

The data above is used to create a more extensive data structure that contained many additional runtime parameters. When the baton component of the music texture program sent a trigger message, the following code line triggered the emitter. GSM (game Send Message) is a function that sent a message to a particular named object: in this case, the "emit.alh.00" emitter: GSM('t', ", 'emit.alh.00').

During runtime, when an emitter receives a trigger message, it runs a procedural code script that uses the emitter data to determine what to do. If it is a burst emitter, it emits a particle for each burst stream, checking its pool of particles for inactive ones to activate. If it is a sequence emitter, it checks its data to determine the particle stream from which to activate a particle.

When an emitter starts a particle at a particular stream, it checks its pool of available particles of the correct type. When and if it found an inactive one: (1) it sets the particle's active flag to "true", (2) it sets the particle location to the start path node at which it is to start, providing a pointer to the path index for that solute, (3) it sets up a tracking node for the game application to use as a reference point to track to, and (4) it turns on tracking for the particle so the game application moves the particle by tracking it to the next node.

Once the emitter activates a particle, the game application controls motion of the particle until it reaches its destination, at which time a tracking script for the particle is invoked that determines what to do next. There are four possibilities depending on the node record: (1) continue to the next node in the list, (2) deactivate the particle: making itself invisible, changing its location to a distant place, turning off its active flag so its emitter knew that it is available for further use, and turning off tracking so the game application ignored it until it is needed again, (3) check for branch condition and branch accordingly, and (4) trigger another event.

One of the primary functions of the simulation is to show solute exchanges at the cellular level at various points along the nephron. Consequently, there are several blue cells stationed at key points that represented the cells along the segment of the nephron they pertained to. These cells have ATP pumps that moved solutes into and out of the cell. Most are sodium-potassium pumps. These pumps take solutes from opposite sides and squirted them out on the reverse side.

The animation for the ATP pumps in the simulation uses the animation application functions to eject ions. However, the animation needs to coordinate with the music and the particle movement. Particles entered the pump, lingered, and then the pump squirted them out.

in reality, the pump has two animation phases, ejection and recovery. Particles enter the pump (where they are hidden) and are deactivated and removed from the path stream. The music sends a trigger message to the emitters and the pump is sent a trigger to start its animation. At the same time, emitters squirt out appropriate particles by setting them at the beginning of a new path and making them active. The pump continues its animation sequence. This made it appear that particles entered, held, and ejected from the pump in a coordinated fashion.

In addition to the simulation, movies are available for viewing. The audio and video components are contained in independent files. While a user activated them from the game application, transport and activation is administered through communications with the coordinating program. User controls send messages to the coordinating program, which then activate sound playback and sent the game application messages indicating from where to play. The coordinating program also sends messages that are used by the game application to update its movie position slider. Volume control is also handled this way: i.e., a user adjusts the sound level control in the game application, which sends a message to the coordinating program to adjust the sound level or turn the mute sound on/off. The volume slider is also updated if volume changes within the audio component.

The described embodiments are to be considered in all respects only as illustrative and not restrictive, and the scope of the invention is not limited to the foregoing description. Those of skill in the art may recognize changes, substitutions, adaptations and other modifications that may nonetheless come within the scope of the invention and range of the invention.

The invention claimed is:

1. A computer system for generating real-time multisensory output, comprising:
   a user interface comprising one or more input elements;
   a processor comprising a music texture program and a music program, wherein the music texture program uses an algorithm to generate a first audio output and the music program uses input received from the one or more input elements to generate real-time a second audio output;
   a baton component configured to generate a pulse for broadcast to the other components as a trigger to perform additional processing;
   a tonic cycler component configured to generate a pitch-class of a scale for the first audio output;
   an ensemble component configured to generate a sequence of notes or chords for the first audio output;
   a tuning component that produces a note value and microtonal offset for the first audio output, wherein the tuning component includes a conversion algorithm that converts pitch to frequency for the first output; and
   an output component that simultaneously outputs the first audio output and the second audio output.

2. The computer system for generating real-time multi-sensory output according to claim 1, wherein the one or more input elements of the user interface is a grid comprising one or more octagons and one or more diamonds.

3. The computer system for generating real-time multi-sensory output according to claim 1 further comprising a simulation program comprising:
   a design component configured to define curves and path descriptions of a visual output;
   an initialization component configured to calculate and create animation data structures of the visual output; and
   a runtime component configured to animate the visual output.

4. The computer system for generating real-time multi-sensory output according to claim 1 further comprising a coordinating program that integrates the first audio output of the music texture program with the second audio output of the music program.

5. The computer system for generating real-time multi-sensory output according to claim 3 further comprising a coordinating program that integrates the first audio output of the music texture program with the visual output of the simulation program.

6. The computer system for generating real-time multi-sensory output according to claim 3 further comprising a coordinating program that integrates the second audio output of the music program with the visual output of the simulation program.

7. The computer system for generating real-time multi-sensory output according to claim 1, wherein the coordinating program monitors user activity and coordinates with the music texture program to output a data stream.

8. The computer system for generating real-time multi-sensory output according to claim 7, wherein the data stream comprises a visual output.

9. The computer system for generating real-time multi-sensory output according to claim 1 further comprising an external source providing a data stream that is coordinated with one or more of the first output and the second output.

10. A computer system for generating real-time multisensory output, comprising:
    a user interface comprising one or more input elements;
    a processor comprising a simulation program, wherein the simulation program uses an algorithm to generate a visual output coordinated with music, the simulation program including:
       a design component configured to define curves and path descriptions of the visual output coordinated with music,
       an initialization component configured to calculate and create animation data structures of the visual output coordinated with music, wherein the animation data structures comprise a node path and trigger emitters that activate particles to follow the node paths; and
       a runtime component configured to animate the visual output coordinated with music,
    an output component that outputs the visual output coordinated with music.

11. The computer system for generating real-time multi-sensory output according to claim 10 further comprising a music texture program configured to use an algorithm to generate a first audio output, wherein the output component simultaneously outputs the first audio output and the visual output.

12. The computer system for generating real-time multi-sensory output according to claim 11 further comprising a music program configured to use the input received from the one or more input elements to generate real-time a second audio output, wherein the output component simultaneously outputs the first audio output, the second audio output, and the visual output.

13. The computer system for generating real-time multi-sensory output according to claim 10 further comprising a coordinating program, wherein the coordinating program monitors user activity and coordinates with the music texture program to output a data stream.

14. The computer system for generating real-time multi-sensory output according to claim 13, wherein the data stream comprises a visual output.

15. The computer system for generating real-time multi-sensory output according to claim 10 further comprising an external source providing a data stream that is coordinated with one or more of the first output and the second output.

16. A computer system for generating real-time multisensory output, comprising:
    a user interface comprising one or more input elements;
    a processor comprising a music texture program and a music program, wherein the music texture program uses an algorithm to generate a first output and the music program uses input received from the one or more input elements to generate real-time a second output;
    a baton component configured to generate a pulse for broadcast to the other components as a trigger to perform additional processing;
    a tonic cycler component configured to generate a pitch-class of a scale for the first output;
    an ensemble component configured to generate a sequence of notes or chords for the first output;

a tuning component that produces a note value and microtonal offset for the first output, wherein the tuning component includes a conversion algorithm that converts pitch to frequency for the first output; and an output component that simultaneously outputs the first output and the second output.

17. The computer system for generating real-time multi-sensory output according to claim 16 wherein one of the first output and the second output is a visual output.

18. The computer system for generating real-time multi-sensory output according to claim 16 wherein one of the first output and the second output is an audio output.

19. The computer system for generating real-time multi-sensory output according to claim 16 further comprising:
a runtime component configured to animate one of the first output and the second output as visual output; and
an output component that outputs the visual output.

20. The computer system for generating real-time multi-sensory output according to claim 16 further comprising:
an output component that outputs the one of the first output and the second output as audio output.

21. The computer system for generating real-time multi-sensory output according to claim 16 further comprising:
a design component configured to define curves and path descriptions of a visual output;
an initialization component configured to calculate and create animation data structures of the visual output;
a runtime component configured to animate the visual output; and
an output component that outputs the visual output.

22. The computer system for generating real-time multi-sensory output according to claim 16 further comprising a coordinating program that monitors user activity and coordinates with the music texture program to output a data stream.

23. The computer system for generating real-time multi-sensory output according to claim 22, wherein the data stream comprises a visual output.

24. The computer system for generating real-time multi-sensory output according to claim 16 further comprising an external source providing a data stream that is coordinated with one or more of the first output and the second output.

* * * * *